(12) United States Patent
Shramkova et al.

(10) Patent No.: US 12,228,756 B2
(45) Date of Patent: Feb. 18, 2025

(54) OPTICAL DEVICE

(71) Applicant: InterDigital CE Patent Holdings, SAS, Paris (FR)

(72) Inventors: Oksana Shramkova, Liffré (FR); Valter Drazic, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 706 days.

(21) Appl. No.: 17/416,381

(22) PCT Filed: Dec. 20, 2019

(86) PCT No.: PCT/EP2019/086776
§ 371 (c)(1),
(2) Date: Jun. 18, 2021

(87) PCT Pub. No.: WO2020/128030
PCT Pub. Date: Jun. 25, 2020

(65) Prior Publication Data
US 2022/0057552 A1 Feb. 24, 2022

(30) Foreign Application Priority Data
Dec. 21, 2018 (EP) .................................... 18215212

(51) Int. Cl.
*G02B 5/18* (2006.01)
*G02B 27/01* (2006.01)

(52) U.S. Cl.
CPC ......... *G02B 5/1866* (2013.01); *G02B 5/1814* (2013.01); *G02B 27/0172* (2013.01);
(Continued)

(58) Field of Classification Search
CPC ................ G02B 5/1866; G02B 5/1814; G02B 27/0172; G02B 2027/0112;
(Continued)

(56) References Cited

U.S. PATENT DOCUMENTS 3,718,383 A    2/1973  Moore
6,099,146 A    8/2000  Imamura
(Continued)

FOREIGN PATENT DOCUMENTS

CN    1319191 A    10/2001
CN    1502050 A    6/2004
(Continued)

OTHER PUBLICATIONS

O. Shramkova, V. Drazic, M. Damghanian, A. Boriskin, V. Allie and L. Blonde, "Localized Photonic Jets Generated by Step-Like Dielectric Microstructures," 2018 20th International Conference on Transparent Optical Networks (ICTON), Bucharest, Romania, 2018, pp. 1-4, doi: 10.1109/ICTON.2018.8473925. (Year: 2018).*
(Continued)

*Primary Examiner* — Darryl J Collins
*Assistant Examiner* — Matthew Y Lee
(74) *Attorney, Agent, or Firm* — Klintworth & Rozenblat IP LLP

(57) ABSTRACT

An optical device and an eyeware apparatus comprising the optical device are disclosed. The optical device comprises a diffraction grating configured to diffract an incident light of a given wavelength on said optical device, said diffraction grating having a grating pitch above said given wavelength and being configured to diffract said incident light at a diffraction order having an absolute value equal to or greater than 2, wherein the optical device comprises an optical waveguide configured for guiding said light diffracted at a diffraction order having an absolute value equal to or greater than 2. The diffraction grating comprises a substrate of a first dielectric material with refractive index $n_3$ and at least one second dielectric material with refractive index $n_2$ deposited on said substrate, where $n_3 < n_2$ or $n_3 = n_2$.

14 Claims, 25 Drawing Sheets

$d=822.4$;
$W_2=130nm$; $H_2=200nm$
$H_1=50nm$

(52) U.S. Cl.
CPC ............... *G02B 2027/0112* (2013.01); *G02B 2027/0123* (2013.01); *G02B 2027/0178* (2013.01)

(58) Field of Classification Search
CPC .... G02B 2027/0123; G02B 2027/0178; G02B 27/0081; G02B 5/32; G02B 6/34; G02B 2027/0174; G02B 27/017; G02B 6/0016; G02B 27/0101

See application file for complete search history.

(56) References Cited

U.S. PATENT DOCUMENTS

| | | | |
|---|---|---|---|
| 6,721,485 | B1 | 4/2004 | Nakamura |
| 6,891,147 | B2 | 5/2005 | Goto |
| 7,142,363 | B2 | 11/2006 | Sato |
| 7,394,535 | B1 | 7/2008 | Chen |
| 7,738,346 | B2 | 6/2010 | Ooi |
| 8,885,997 | B2 | 11/2014 | Nguyen |
| 9,099,370 | B2 | 8/2015 | Nishiwaki |
| 9,140,602 | B2 | 9/2015 | Narasimhan |
| 9,297,939 | B2 | 3/2016 | Palanchoke |
| 9,383,582 | B2 | 7/2016 | Tang |
| 9,419,036 | B2 | 8/2016 | Saitou |
| 9,564,469 | B2 | 2/2017 | Kim |
| 9,766,467 | B2 | 9/2017 | Sohn |
| 9,827,209 | B2 | 11/2017 | Kostamo |
| 9,880,393 | B2 | 1/2018 | Kim |
| 9,891,436 | B2 | 2/2018 | Wall |
| 10,534,115 | B1 | 1/2020 | Calafiore |
| 10,866,360 | B2 | 12/2020 | Khorasaninejad |
| 11,163,175 | B2 | 11/2021 | Boriskin |
| 11,204,452 | B2 | 12/2021 | Paniagua Dominguez |
| 11,275,252 | B2 | 3/2022 | Boriskin |
| 11,396,474 | B2 | 7/2022 | Drazic |
| 11,573,356 | B2 | 2/2023 | Shramkova |
| 11,604,363 | B2 | 3/2023 | Damghanian |
| 2004/0198582 | A1 | 10/2004 | Borrelli |
| 2005/0002611 | A1* | 1/2005 | Levola ................ G02B 6/34 385/11 |
| 2006/0124833 | A1 | 6/2006 | Toda |
| 2006/0250933 | A1 | 11/2006 | Asada |
| 2009/0190094 | A1 | 7/2009 | Watanabe |
| 2009/0205090 | A1 | 8/2009 | Mimouni |
| 2010/0091376 | A1 | 4/2010 | Sano |
| 2010/0134890 | A1 | 6/2010 | Chen |
| 2010/0188537 | A1 | 7/2010 | Hiramoto |
| 2011/0043918 | A1 | 2/2011 | Crouse |
| 2011/0235166 | A1 | 9/2011 | Zhu |
| 2012/0147373 | A1 | 6/2012 | Kamimura |
| 2013/0099343 | A1 | 4/2013 | Toshikiyo |
| 2013/0099434 | A1 | 4/2013 | Yano |
| 2013/0250421 | A1 | 9/2013 | Wakabayashi |
| 2013/0322810 | A1 | 12/2013 | Robbins |
| 2014/0192409 | A1 | 7/2014 | Yamaguchi |
| 2015/0063753 | A1 | 3/2015 | Evans |
| 2015/0219842 | A1 | 8/2015 | Sqalli |
| 2015/0286060 | A1 | 10/2015 | Roh |
| 2015/0301333 | A1 | 10/2015 | Levesque |
| 2015/0323800 | A1 | 11/2015 | Nam |
| 2015/0362641 | A1 | 12/2015 | Boyraz |
| 2015/0362841 | A1 | 12/2015 | Zelsacher |
| 2016/0033697 | A1* | 2/2016 | Sainiemi ............ C03C 17/00 359/575 |
| 2016/0047951 | A1 | 2/2016 | Eckstein |
| 2016/0054172 | A1 | 2/2016 | Roh |
| 2016/0064172 | A1 | 3/2016 | Kirbawy |
| 2016/0064448 | A1 | 3/2016 | Shin |
| 2016/0070062 | A1 | 3/2016 | Lipson |
| 2016/0172390 | A1 | 6/2016 | Numata |
| 2016/0231568 | A1 | 8/2016 | Saarikko |
| 2016/0274281 | A1 | 9/2016 | Lutolf |
| 2017/0006278 | A1 | 1/2017 | Vandame |
| 2017/0012078 | A1 | 1/2017 | Han |
| 2017/0090206 | A1 | 3/2017 | Kim |
| 2017/0092668 | A1 | 3/2017 | Kim |
| 2017/0092676 | A1 | 3/2017 | Yun |
| 2017/0097510 | A1 | 4/2017 | Sohn |
| 2017/0098672 | A1 | 4/2017 | Yun |
| 2017/0179178 | A1 | 6/2017 | Park |
| 2017/0201658 | A1 | 7/2017 | Rosenblatt |
| 2017/0212348 | A1 | 7/2017 | Fu |
| 2017/0307886 | A1 | 10/2017 | Stenberg |
| 2017/0315346 | A1 | 11/2017 | Tervo |
| 2017/0351111 | A1 | 12/2017 | Jeong |
| 2018/0113313 | A1* | 4/2018 | Tekolste ............ G02B 27/4205 |
| 2018/0231771 | A1* | 8/2018 | Schuck, III ........... G02B 5/20 |
| 2018/0252850 | A1* | 9/2018 | Aoki ................... G02B 5/1861 |
| 2018/0259691 | A1* | 9/2018 | Wang .............. G02F 1/133504 |
| 2018/0354844 | A1 | 12/2018 | Drazic |
| 2019/0101700 | A1 | 4/2019 | Boriskin |
| 2019/0121239 | A1 | 4/2019 | Singh |
| 2019/0243233 | A1 | 8/2019 | Boriskin |
| 2019/0257986 | A1 | 8/2019 | Paniagua Dominguez |
| 2020/0066811 | A1* | 2/2020 | Cha ..................... H10K 50/858 |
| 2020/0233223 | A1 | 7/2020 | Shramkova |
| 2020/0348526 | A1 | 11/2020 | Boriskin |
| 2021/0041609 | A1 | 2/2021 | Shramkova |
| 2021/0041709 | A1 | 2/2021 | Damghanian |
| 2021/0088802 | A1* | 3/2021 | Murakami ......... G02B 27/4222 |
| 2021/0233291 | A1 | 7/2021 | Shramkova |
| 2022/0059250 | A1 | 2/2022 | Shramkova |

FOREIGN PATENT DOCUMENTS

| | | |
|---|---|---|
| CN | 1606704 A | 4/2005 |
| CN | 1661478 A | 8/2005 |
| CN | 1693928 A | 11/2005 |
| CN | 1756972 A | 4/2006 |
| CN | 1762009 A | 4/2006 |
| CN | 1898584 A | 1/2007 |
| CN | 101114031 A | 1/2008 |
| CN | 101114032 A | 1/2008 |
| CN | 101241202 A | 8/2008 |
| CN | 101263378 A | 9/2008 |
| CN | 101359094 A | 2/2009 |
| CN | 101467021 A | 6/2009 |
| CN | 101611333 A | 12/2009 |
| CN | 101688929 A | 3/2010 |
| CN | 102498374 A | 6/2012 |
| CN | 101799589 B | 5/2013 |
| CN | 103119498 A | 5/2013 |
| CN | 104718479 A | 6/2015 |
| CN | 105074511 A | 11/2015 |
| CN | 105765421 A | 7/2016 |
| CN | 106331445 A | 1/2017 |
| CN | 106772734 A | 5/2017 |
| CN | 106932845 A | 7/2017 |
| CN | 107462983 A | 12/2017 |
| CN | 108508506 A | 9/2018 |
| CN | 108885354 A | 11/2018 |
| CN | 108919399 A | 11/2018 |
| CN | 109073885 A | 12/2018 |
| CN | 109891318 A | 6/2019 |
| EP | 1406098 A1 | 4/2004 |
| EP | 1542043 A1 | 6/2005 |
| EP | 1904827 A2 | 4/2008 |
| EP | 2196729 | 6/2010 |
| EP | 2229938 | 9/2010 |
| EP | 2955753 | 12/2015 |
| EP | 3223062 A1 | 9/2017 |
| EP | 3223063 A1 | 9/2017 |
| EP | 3240046 A1 | 11/2017 |
| EP | 3312646 A1 | 4/2018 |
| EP | 3312660 A1 | 4/2018 |
| EP | 3312674 A1 | 4/2018 |
| EP | 3339938 A1 | 6/2018 |
| EP | 3385219 A1 | 10/2018 |
| EP | 3499278 | 6/2019 |
| EP | 3540479 A1 | 9/2019 |
| EP | 3540499 | 9/2019 |
| EP | 3540499 A1 | 9/2019 |
| EP | 3588150 | 1/2020 |
| EP | 3591700 A1 | 1/2020 |

(56) References Cited

FOREIGN PATENT DOCUMENTS

| | | |
|---|---|---|
| EP | 3671293 | 6/2020 |
| EP | 3671322 A1 | 6/2020 |
| GB | 2529003 | 2/2016 |
| JP | 2003005129 A | 1/2003 |
| JP | 2014134564 | 7/2014 |
| JP | 2016500160 A | 1/2016 |
| JP | 2017063198 A | 3/2017 |
| TW | 200502570 A | 1/2005 |
| TW | 201042286 A | 12/2010 |
| WO | 03007032 A1 | 1/2003 |
| WO | 2003025635 A1 | 3/2003 |
| WO | 2004094326 A3 | 5/2005 |
| WO | 2007031991 A2 | 3/2007 |
| WO | WO-2009083977 A2 * | 7/2009 ......... G02B 27/0172 |
| WO | 2014036537 A1 | 3/2014 |
| WO | 2014044912 | 3/2014 |
| WO | 2017116637 | 7/2017 |
| WO | 2017116637 A1 | 7/2017 |
| WO | 2017131983 | 8/2017 |
| WO | 2017162880 A1 | 9/2017 |
| WO | 2017162882 A1 | 9/2017 |
| WO | 2017180403 | 10/2017 |
| WO | 2017180403 A1 | 10/2017 |
| WO | 2018052750 A1 | 3/2018 |
| WO | 2018102582 | 6/2018 |
| WO | 2018102582 A1 | 6/2018 |
| WO | 2018102834 A2 | 6/2018 |
| WO | 2020128030 A1 | 6/2020 |
| WO | 2021053182 | 3/2021 |

OTHER PUBLICATIONS

Ashkin, A., et. al., "Observation of a single-beam gradient force optical trap for dielectric particles", Optics Letters vol. 11, Issue 5, May 1986 pp. 288-290 (3 pages).

Ahskin, A., et. al., "Optical trapping and manipulation of viruses and bacteria", Science, Mar. 1987, vol. 235, Issue 4795, pp. 1517-1520 (4 pages).

Berry, M. V., et. al., "Nonspreading wave packets", American Journal of Physics, vol. 47, Iss. 3, Mar. 1979 (4 pages).

Block, Steven M., et al., "Bead movement by single kinesin molecules studied with optical tweezers", Nature, vol. 348, Nov. 1990 pp. 348-352 (5 pages).

Bosanac, Lana, et. al., "Efficient Optical Trapping and Visualization of Silver Nanoparticles", Nano Letters 2008, vol. 8, No. 5, pp. 1486-1491 (6 pages).

Čižmár, Thomas, et. al., "Optical conveyor belt for delivery of submicron objects" Applied Physics Letters, vol. 86, Issue 17, Apr. 25, 2005, 3 pages.

Cui, Xudong, et. al., "Optical forces on metallic nanoparticles induced by a photonic nanojet", Optics Express, vol. 16, Issue 18, Oct. 2008, pp. 13560-13568 (9 pages).

Eisen, L., et al., "Total internal reflection diffraction grating in conical mounting." Optics communications 261, No. 1, 2006, pp. 13-18 (6 pages).

Gordon, James P., "Radiation Forces and Momenta in Dielectric Media", Phys. Rev. A vol. 8, 14—Published Jul. 1, 1973, 8 pages. Available online at: http://totuvach.free.fr/Articles/gordon73.pdf.

Jones, P. H., et. al., "Trapping and manipulation of microscopic bubbles with a scanning optical tweezer", Applied Physics Letters, vol. 89, Issue 8, Aug. 21, 2006 (3 pages).

Levola, T., "Diffractive optics for virtual reality displays." Journal of the Society for Information Display 14, No. 5, 2006 pp. 467-475 (9 pages).

Liu, Yujie, et al., "Total internal reflection diffraction grating in conical mounting and its application in planar display", International Conference on Photonics and Optical Engineering (icPOE 2014), vol. 9449, pp. 9449-9449-6, 2015 (6 pages).

Lotti, F. et al., "Nanoparticle-based metasurfaces for angular-independent spectral filtering applications", 2017 Conference on Lasers and Electro-Optics Europe & European Quantum Electronics Conference (CLEO/Europe-EQEC), 2017.

Mahani, F. F., et al, "Optimization of plasmonic color filters for CMOS image sensors by genetic algorithm", 2nd Conference on Swarm Intelligence and Evolutionary Computation (CSIEC), 2017, 4 pages.

Neves, A. A. R., "Photonic nanojets in optical tweezers." Journal of Quantitative Spectroscopy and Radiative Transfer 162, Mar. 17, 2015 (20 pages).

Siviloglou, Georgios A., et. al., "Accelerating finite energy Airy beams", Apr. 15, 2007, vol. 32, No. 8, Optics Letters, pp. 979-981 (3 pages).

Siviloglou, Georgios A., et. al., "Observation of Accelerating Airy Beams", Physics Review Letters, vol. 99, Issue 21—Published Nov. 20, 2007 (4 pages).

Tao, Z. et al., "Design of polarization-dependent color filters based on all-dielectric metasurfaces for dynamic modulation of color HSV", 11th International Congress on Engineered Materials Platforms for Novel Wave Phenomena (Metamaterials), 2017, 3 pages.

V. Garcés-Chávez, et. al., "Simultaneous micromanipulation in multiple planes using a self-reconstructing light beam", Nature vol. 419, Sep. 12, 2002, 145-147 (3 pages).

Wang, Hoatian, et. al., "Trapping and manipulating nanoparticles in photonic nanojets", Optics Letters vol. 41 No. 7, Apr. 2016, 4 pages.

X. Tsampoula, et. al., "Femtosecond cellular transfection using a nondiffracting light beam", Applied Physics Letters, vol. 91, Issue 5, Jul. 30, 2007 (3 pages).

Yannopapas, Vassilios, "Photonic nanojets as three-dimensional optical atom traps: A theoretical study", Optics Communications, vol. 285, Issue 12, pp. 2952-2955, Jun. 1, 2012, 3 pages.

Zhang, Li, et al., "CE4-related: History-based Motion Vector Prediction", Joint Video Experts Team (JVET) of ITU-T SG 16 WP 3 and ISO/IEC JTC 1/SC 29/WG 11, Document: JVET-K0104-v5, 11th Meeting: Ljubljana, SI, Jul. 10-18, 2018 (7 pages).

Zhang, Peng, et. al., "Trapping and guiding microparticles with morphing autofocusing Airy beams", Optics Letters, vol. 36, No. 15, Aug. 2011, pp. 2883-2885 (3 pages).

Zhanjun, Yan, et al., "Virtual display design using waveguide hologram in conical mounting configuration." Optical Engineering, Sep. 2011, 50:50-50-9 (8 pages).

Zheng, Zhu, et. al., "Optical trapping with focused Airy beams", Applied Optics vol. 50, Issue 1, 2011, pp. 43-49 (7 pages).

J. R. DeVore, "Refractive Indices of Rutile and Sphalerite," J. Opt. Soc. Am. 41, pp. 416-419, 1951 (4 pages).

International Preliminary Report on Patentability for PCT/EP2019/063802 issued on Dec. 29, 2020, 8 pages.

Genevet, Patrice, et. al., "Recent Advances in Planar Optics: From Plasmonic to Dielectric Metasurfaces". Optica, vol. 4, No. 1, Jan. 2017, pp. 139-152.

Aieta, Francesco, et. al., "Multiwavelength Achromatic Metasurfaces by Dispersive Phase Compensation". Sciencexpress, 2015, (8 pages).

Khorasaninejad, Mohammadreza, et. al., "Achromatic Metasurface Lens at Telecommunication Wavelengths". Nano Letters, 2015, (5 pages).

Deng, Zi-Lan, et. al., "Wide-Angle and High-Efficiency Achromatic Metasurfaces for Visible Light". Optical Express, vol. 24, No. 20 pp. 23118-23128 (12 pages).

Avayu, Ori, et. al., "Composite Functional Metasurfaces for Multispectral Achromatic Optics". Nature Communications, 2017, pp. 1-7 (7 pages).

Nishiwaki, Seiji, et. al., "Efficient Colour Splitters for High-Pixel-Density Image Sensors". Nature Photonics, vol. 7, Mar. 2013, pp. 240-246.

International Search Report and Written Opinion of the International Searching Authority for PCT/EP2019/085489, mailed Jan. 30, 2020, 11 pages.

Yi, Jianjia, et. al., "Coherent Beam Control With an All-Dielectric Transformation Optics Based Lens". Scientific Reports, vol. 6, No. 1, Jan. 5, 2016, pp. 1-8.

Zhao, Yanhui, et. al., "Beam Bending via Plasmonic Lenses". Optics Express, vol. 18, No. 22, Oct. 25, 2010, pp. 23458-23465.

(56) References Cited

OTHER PUBLICATIONS

Jun, Young Chul, et. al., "Optical Manipulation With Plasmonic Beam Shaping Antenna Structures". Advances in OptoElectronicsm, (2012).
Khorasaninejad, Mohammadreza, et. al., "Super-Dispersive Off-Axis Meta-Lenses for Compact High Resolution Spectroscopy". Nano Letters, vol. 16, No. 6, (2016), pp. 3732-3737.
Liu, Zhaowei, et. al., "Tuning the Focus of a Plasmonic Lens by the Incident Angle". Applied Physics Letters, vol. 88, No. 17, (2006), pp. 171108-1-171108-2.
Chen, Yiguo, et. al., "Engineering the Phase Front of Light With Phase-Change Material Based Planar Lenses". Scientific Reports vol. 5, No. 1, Mar. 2, 2015, pp. 1-7.
Kong, Soon-Cheol, et. al., "Photonic Nanojet-Enabled Optical Data Storage". Optical Society of America, Optics Express, vol. 16, No. 18, Sep. 1, 2008, pp. 13713-13719.
Pacheco-Peña, V., et. al., "Terajets Produced by Dielectric Cuboids". Applied Physics Letters 105, 084102, (2014), doi: 10.1063/1.4894243, 5 pages.
Pacheco-Peña, V., et. al., "Multifrequency Focusing and Wide Angular Scanning of Terajets". Optical Society of America, Optics Letters, vol. 40, No. 2, (2015), 5 pages.
Itagi, A. V., et. al., , "Optics of Photonic Nanojets". Optical Society of America. J. Opt. Soc. Am. A , Vo.22, Dec. 2005 pp. 2847-2858 (12 pages).
Heifetz, Alexander, et. al., "Subdiffraction Optical Resolution of a Gold Nanosphere Located Within the Nanojet of a Mie-Resonant Dielectric Microsphere". Optical Express, vol. 15, No. 25, (2007), 17334-17342.
Devilez, Alexis, et. al., "Three-Dimensional Subwavelength Confinement of Light With Dielectric Microspheres". Optics Express, vol. 17, No. 4, Feb. 16, 2009, pp. 2089-2094.
Shen, Yuecheng, et. al., "Ultralong Photonic Nanojet Formed by a Two-Layer Dielectric Microsphere". Optical Letters, Optical Society of America, vol. 39, No. 14, Jul. 15, 2014, 4120-4123.
Ruiz, César Méndez, et. al., "Detection of Embedded Ultrasubwavelength-Thin Dielectric Features Using Elongated Photonic Nanojets". Optical Express, vol. 18, No. 16, Aug. 2, 2010, pp. 16805-16812.
Geints, Yuri E., et. al., "Photonic Nanojet Calculations in Layered Radially Inhomogeneous Micrometer-Sized Spherical Particles". Optical Society of America, vol. 28, No. 8, Aug. 2011, 1825-1830.
Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.
Mao, Xiurun, et. al., "Tunable Photonic Nanojet Formed by Generalized Luneburg Lens". Optics Express, vol. 23, No. 20, (2015), pp. 26426-26433.
Geints, Yu, E., et. al., "Modeling Spatially Localized Photonic Nanojets From Phase Diffraction Gratings". Journal of Applied Physics, vol. 119, No. 15, Apr. 21, 2016, pp. 153101-1-153101-6.
International Search Report and Written Opinion of the International Searching Authority for PCT/EP2019/055679 mailed May 16, 2019, 10 pages.
International Preliminary Report on Patentability for PCT/EP19/055679 issued on Sep. 15, 2020, 6 pages.
Kotlyar, Victor, et. al., "Photonic Nanojets Generated Using Square-Profile Microsteps". Optical Society of America, Applied Optics, vol. 53, No. 24, Aug. 20, 2014, pp. 5322-5329.
International Search Report and Written Opinion of the International Searching Authority for PCT/EP2019/055905 mailed May 22, 2019, 12 pages.
International Preliminary Report on Patentability for PCT/EP2019/055905 issued on Sep. 15, 2020, 8 pages.
Xiao, Jiasheng, et. al., "Design of Achromatic Surface Microstructure for Near-Eye Display With Diffractive Waveguide". Optics Communications, vol. 452, (2019), pp. 411-416.
International Search Report and Written Opinion of the International Searching Authority for PCT/EP2019/063802 mailed Sep. 16, 2019, 14 pages.

Ang, Angeleene S., et. al., "'Photonic Hook' Based Optomechanical Nanoparticle Manipulator". Scientific Reports, vol. 8. No. 2029, Published online: Feb. 1, 2018, pp. 1-7.
Chaumet, P. C., et. al., "Time-Averaged Total Force on a Dipolar Sphere in an Electromagnetic Field". Optics Letters, vol. 25, No. 15, (2000), pp. 1065-1067 (3 pages).
Xu, Chen, et. al., "Photon Nanojet Lens: Design, Fabrication and Characterization". Nanotechnology, vol. 27, No. 16, Mar. 4, 2016, pp. 1-6.
Yue, Liyang, et. al., "Photonic Hook: A New Curved Light Beam". Optics Letters, vol. 43, No. 4, Feb. 2018, pp. 771-774 (5 pages).
International Search Report and Written Opinion of the International Searching Authority PCT/EP2019/084526 mailed Mar. 10, 2020, 15 pages.
Boriskin, Artem, et. al., "Near Field Focusing by Edge Diffraction". Optics Letters, vol. 43, No. 16, Aug. 2018, pp. 4053-4056 (4 pages).
Shramkova, Oksana, et. al., "Localized Photonic Jets Generated by Step-Like Dielectric Microstructures". IEEE 20th International Conference on Transparent Optical Networks (ICTON), (2018), pp. 1-4. (4 pages).
Liu, Cheng-Yang, et. al., "Localized Photonic Nanojets Formed by Core-Shell Diffraction Gratings". Integrated Optics: Physics and Simulations III, International Society for Optics and Photonics, vol. 10242, (2017), p. 102420W (4 pages).
International Search Report and Written Opinion of the International Searching Authority for PCT/EP2019/063739 mailed Aug. 8, 2019, (11 pages).
International Preliminary Report on Patentability for PCT/EP2019/063739 issued on Jan. 5, 2021, (7 pages).
International Search Report and Written Opinion of the International Searching Authority for PCT/EP2019/086776 mailed Mar. 6, 2020, 13 pages.
International Search Report and Written Opinion for PCT/EP2021/057273 mailed Jun. 30, 2021 (15 pages).
International Preliminary Report on Patentability for PCT/EP2019/085489 issued Jun. 16, 2021, (8 pages).
International Preliminary Report on Patentability for PCT/EP2019/086776 issued Jun. 16, 2021, (9 pages).
Teranishi, N. et al.,"Evolution of optical structure in image sensors." In 2012 International Electron Devices Meeting, pp. 24-1. IEEE, 2012 (4 pages).
Nishiwaki, S. et al., "Highly Sensitive Image Sensors Using Micro Color Splitters." ITE Technical Report vol. 37 No. 47, Dec. 2014 (2 pages).
Chen, Q. et al., "Nanophotonic image sensors." Small 12, No. 36, 2016: 4922-4935 (14 pages).
Gennarelli, G.et al., "A uniform asymptotic solution for the diffraction by a right-angled dielectric wedge" IEEE transactions on antennas and propagation, vol. 59 No. 3, Mar. 2011 pp. 898-903 (6 pages).
Wang, P. et al., "Ultra-high-sensitivity color imaging via a transparent diffractive-filter array and computational optics: supplementary material." Optica, Oct. 2015 (9 pages).
Fontaine, R. "The state-of-the-art of mainstream CMOS image sensors." In Proceedings of the International Image Sensors Workshop, 2015 (4 pages).
Wang, P. et al., "Computational single-shot hyper-spectral imaging based on a microstructured diffractive optic." In 2016 Conference on Lasers and Electro-Optics (CLEO), IEEE, 2016 (2 pages).
Palanchoke, U. et al., "Spectral sorting of visible light using dielectric gratings." Optics Express 25, No. 26, Dec. 2017 pp. 33389-33399 (11 pages).
Rakovich, Y. P. et al., "Photonic Nanojets in Coupled Microcavities." In the European Conference on Lasers and Electro-Optics, p. JSV2_3. Optical Society of America, 2009 (1 page).
Yang, J. et al., "Polychromatic see-through near-eye display design with two waveguides and a large field-of-view." In Optics, Photonics and Digital Technologies for Imaging Applications IV, vol. 9896, p. 989605. International Society for Optics and Photonics, 2016 (7 pages).
International Preliminary Report on Patentability for PCT/EP2019/084526 issued on Jun. 16, 2021, 11 pages.

(56) References Cited

OTHER PUBLICATIONS

Liu, Cheng-Yang, "Photonic Jets Produced by Dielectric Micro Cuboids". Applied Optics, vol. 54, Issue 29, (2015), pp. 8694-8699.
Varghese, B. et al., "Influence of an edge height on the diffracted EM field distribution." In 2019 21st International Conference on Transparent Optical Networks (ICTON), pp. 1-4. IEEE, 2019.
Shramkova, O. et al "Photonic nanojet generated by dielectric multi-material microstructure" META Jul. 2019, (2 pages).

\* cited by examiner $n_2=2.105$ $d=822.4; W_1=260nm$
$W_2=130nm; H_2=200nm$ $d=822.4;$
$W_2=130nm;\ H_2=200nm$
$H_1=50nm$

OPTICAL DEVICE

The present application is a national stage application under 35 U.S.C. § 371 of International Application No. PCT/EP2019/086776, entitled "OPTICAL DEVICE", filed on Dec. 20, 2019, which claims benefit from European Patent Application Serial No. 18215212.4, entitled "AN OPTICAL DEVICE COMPRISING AT LEAST ONE DIFFRACTION GRATING HAVING A GRATING ABOVE THE WAVELENGTH", filed Dec. 21, 2018.

TECHNICAL FIELD

The present disclosure relates to the field of optics and photonics, and more specifically to an optical device comprising at least one diffraction grating. It may find applications in the field of conformable and wearable optics (i.e. AR/VR glasses (Augmented Reality/Virtual Reality)), as well as in a variety of other electronic consumer products comprising displays and/or lightweight imaging systems.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

AR/VR glasses are considered as the next generation human-machine interfaces, thus raising significant interest of major industrial players in the domain of consumer electronics and mobile devices.

Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

The tradeoff between the image quality and physical size of the optical components motivates research into ultra-compact optical components that can be used as building blocks for more complex optical systems, such as AR/VR glasses. Such optical components shall also be easy to fabricate and replicate.

In such AR/VR glasses, various types of refractive and diffractive lenses and beam-forming components are used to guide the light from a micro-display or a projector towards the human eye, allowing forming a virtual image that is superimposed with an image of the physical world seen with a naked eye (in case of AR glasses) or captured by a camera (in case of VR glasses).

Some kinds of AR/VR glasses utilize optical waveguides wherein light propagates into the optical waveguide by TIR (for Total Internal Reflection) only over a limited range of internal angles. The FoV (for Field of View) of the waveguide depends on the material of the waveguide.

The FoV of a waveguide is defined as the maximum span of $\theta_1^+ - \theta_1^+$ which propagates into the waveguide by TIR. In general and as illustrated by FIG. 1A, the biggest angular span that can be coupled into the waveguide is defined by two rays: the ray critical ($\theta_1^C$ in FIG. 1A) having incident angle $\theta_1^C$ and the grazing ray ($\theta_1^G$ in FIG. 1A) having incident angle $\theta_1^G$. The critical ray is the light ray that just diffracts into the waveguide at the critical angle $\theta_2^C$ defined by sin $$\theta_2^C = \frac{1}{n_2(\lambda)}$$

where $n_2$ is the refractive index of the waveguide's material and $\lambda$ the wavelength of the incident light. The grazing ray is the ray having an input angle that diffracts into the waveguide at grazing incidence $\theta_1^G = 90°$. The theoretical FoV of a waveguide presented above is for a single mode system where one single diffraction mode is used to carry the image: either +1 or −1 diffraction mode.

In WO2017180403, a waveguide with extended Field of View is proposed wherein a dual mode image propagation is used. In this method, the diffraction mode +1 is used to carry the right hand side image (negative angles of incidence on the incoupler) in one direction and the −1 mode is used to propagate the positive angles of incidence into the opposite direction into the waveguide. Such a system is illustrated by FIG. 1B wherein critical angle and grazing angle are shown for both diffraction modes. In WO2017180403, combining both half images is done thanks to the pupil expanders and out-couplers at the exit of the waveguide so that the user sees one single image. The benefit of the system is to double the Field of View since each half image can use the whole angular bandwidth of the waveguide in each direction of propagation.

However, such an optical waveguide and most optical waveguides comprise a diffraction grating. The period d (also known as grating pitch) of such diffraction grating depends on the wavelength $\lambda$ of the incident light and on the refractive index $n_2$ of the material of the waveguide, and can be defined by $$d = \frac{2 \times \lambda}{n_2 + 1} \quad \text{(Eq. 1)}$$

If we consider the ratio between the grating pitch and the wavelength: $d/\lambda$, in the case of equation 1 presented above, then $3/2 < n_2 < 2$ and $2/3 < d/\lambda < 4/5$ and in any case $d/\lambda < 1$ a value that can be qualified as being sub-wavelength. Equation 1 in any case implies that the diffraction grating has a sub-wavelength structure.

In US20160231568, a waveguide for eye glasses is disclosed wherein the grating pitch of the structure is between 250 and 500 nm. This geometrical particularity makes the grating excessively difficult to fabricate. It is out of reach of photo lithographic techniques since the structure is sub-wavelength and the required precision challenges even electron-beam lithography technology.

Therefore, there is a need for an improved optical waveguide comprising a diffraction grating.

SUMMARY

An optical device comprising a diffraction grating configured to diffract an incident light, said diffraction grating having a grating pitch above a wavelength of the incident light and being configured to diffract said incident light at a diffraction order having an absolute value equal to or greater than 2, wherein the optical device comprises an optical waveguide configured for guiding said incident light diffracted at a diffraction order having an absolute value equal to or greater than 2.

Thus, according to the present disclosure, the diffraction grating is dedicated to a wavelength or a group of wavelengths. The diffraction grating is configured so that the main part of incident light is diffracted at a diffraction order having an absolute value equal to or greater than 2. Using higher diffraction orders than in prior art systems, meaning |M|>1, with M being the diffraction order, has the effect of multiplying the wavelength by the order which is used in the diffraction equation. As the grating pitch is a function of the product $M\lambda$, this means that the grating pitch is multiplied by M and the structures used for the in-coupler are much bigger. This opens new possibilities in the fabrication technology, because nanoimprinting could be used. We also get less lines per mm for the grating density and the fabrication process can be optimized since the structures will no more be sub-wavelength but over-wavelength.

According to the present disclosure $$\frac{d}{\lambda} > 1,$$

with d being the grating pitch and $\lambda$ the wavelength, the diffraction grating has thus over-wavelength structures which put less constraints on fabrication than sub-wavelength structures.

According to an embodiment of the disclosure, said diffraction grating comprises a substrate of a first dielectric material with refractive index $n_3$ and at least one second dielectric material with refractive index $n_2$ deposited on said substrate, where $n_3 < n_2$ or $n_3 = n_2$.

According to an embodiment of the disclosure, said diffraction grating comprises a base pattern comprising said second dielectric material, said base pattern being configured to form a nanojet beam associated with edges of the base pattern from said incident light on said diffraction grating. According to this embodiment, the base pattern of the diffracting grating comprises edges forming a slope so that a nanojet beam associated with edges of the base pattern is formed when light is incident on the optical device.

Advantageously, according to this embodiment of the present disclosure, the nanojet beam forming phenomenon is exploited for transferring energy from the main part of the incident light into second order diffraction beams. The use of a base pattern configured to form nanojet beams from the edges of the base pattern allows to provide high diffraction efficiency and high diffraction uniformity.

Prior art systems do not work with higher order diffraction as the configuration of prior art systems provides a diffraction efficiency close to 0. The use of a base pattern configured to form nanojet beams allows to achieve a high diffraction efficiency, while the diffraction uniformity is average and at least equal to what prior art systems produce with lower diffraction orders.

According to another embodiment of the disclosure, said base pattern is configured according to any one of the following arrangements:

said base pattern comprises a block of the first dielectric material with refractive index $n_3$, on top of said substrate, said block of said first same dielectric material with refractive index $n_3$ being inserted into one block of said second dielectric material with refractive index $n_2$, or said base pattern comprises a block of said first dielectric material with refractive index $n_3$, on top of said substrate, said block of said first dielectric material with refractive index $n_3$ being placed between two blocks of said second dielectric material with refractive index $n_2$, said block of said first dielectric material with refractive index $n_3$ and said two blocks of said second dielectric material with refractive index $n_2$ having identical heights, or said base pattern comprises two blocks of said second dielectric material with refractive index $n_2$ having identical widths and heights, on top of said substrate, said two blocks being separated by a distance, or said base pattern comprises one block of said second dielectric material with refractive index $n_2$ on top of said substrate, said block having a U shape.

According to another embodiment of the disclosure, when said base pattern comprises two blocks of said second dielectric material with refractive index $n_2$ having identical widths and heights, on top of said substrate, said two blocks being separated by the distance $W_1$, said two blocks have a height $H_2$ with $$H_2 \geq \frac{W_2}{\tan\theta'_{B1}}$$

and $$H_2 < \frac{W_2}{\tan\theta''_{B1}}$$

with $W_2$ being the width of each of the two blocks and $\theta'_{B1}$ and $\theta''_{B1}$ being respective angles of nanojet beams radiations associated with edges of the base pattern from said light incident on said at least one diffraction grating, wherein $$\theta'_{B1} \approx \theta_{B1} - \frac{\theta_i}{2}, \theta''_{B1} \approx \theta_{B1} + \frac{\theta_i}{2}$$

being the angle of the incident light with respect to a normal to the top surface of said diffraction grating and $$\theta_{B1} \approx \frac{90° - \sin^{-1}\left(\frac{n_1}{n_2}\right)}{2},$$

$n_1$ being the refractive index of a host medium in which the diffraction grating is placed.

According to another embodiment of the disclosure, when said base pattern comprises one block of said second dielectric material with refractive index $n_2$ on top of said substrate, having a U shape, said U-shape comprising two blocks of height $H_2$ and width $W_2$ separated by a central block of height $H_1$, with $H_1$ lower than $H_2$, and $$H_2 - H_1 \geq \frac{W_2}{\tan\theta'_{B1}}$$

with $$\theta'_{B1} \approx \theta_{B1} - \frac{\theta_i}{2}$$

with $\theta_i$ being the angle of the incident light with respect to a normal to the top surface of said diffraction grating and $$\theta_{B1} \approx \frac{90° - \sin^{-1}\left(\frac{n_1}{n_2}\right)}{2},$$

$n_1$ being the refractive index of the host medium in which the diffraction grating is placed.

According to another embodiment of the disclosure, $W_1$ being said the distance separating the two blocks or a width of said central block of the block having a U-shape, and $W_2$ being the width of each of said two blocks or of each of said two lobes, $W_1$ and $W_2$ depend on a grating pitch d of said diffraction grating with $$W_1 < \frac{d}{3} \text{ and } W_1 + W_2 \neq \frac{d}{2}.$$

According to another embodiment of the disclosure, said base pattern has a symmetric geometry. According to this embodiment, the optical device can be used in dual mode. For instance, it can be implemented in a waveguide which separates right hand side and left hand side of an input image to double the Field of View of the waveguide.

According to another embodiment of the disclosure, said base pattern has an asymmetric geometry. According to this embodiment, the optical device is designed for single mode diffraction, for instance for an, in-coupler that deviates the image into a signal side of a waveguide. This embodiment allows to have even a bigger grating pitch.

According to another embodiment of the disclosure, said diffraction grating is configured to diffract light for a group of wavelengths comprising more than one wavelength, and said grating pitch is above the highest wavelength of said group of wavelengths.

According to another embodiment of the disclosure, the optical device according to any one of the embodiments disclosed above comprises one diffraction grating per Red, Green and Blue color.

According to another embodiment of the disclosure, the optical device is an optical waveguide. The optical device can advantageously be used as a waveguide, for instance a waveguide for AR/VR glasses.

According to another embodiment of the disclosure, said diffraction grating is configured for in-coupling light incoming into said optical waveguide or for extracting light out of said optical waveguide.

According to another embodiment of the disclosure, said diffraction grating is configured for in-coupling light incoming into said optical waveguide and said optical waveguide comprises another diffraction grating configured for extracting light out of said optical waveguide, said other diffraction grating having a grating pitch above a wavelength of said extracted light and said other diffraction grating being configured to diffract said extracted light at a diffraction order having an absolute value equal to or greater than 2.

According to another aspect of the present disclosure, an eyewear apparatus is disclosed. Such an eyewear apparatus comprises at least one optical device according to any one of the embodiments discussed above.

According to an embodiment of the disclosure, the eyewear apparatus comprises:
 a light display engine configured for emitting an image to be displayed,
 a group of optics configured for coupling an incoming light from the light display engine to said optical waveguide,
 said optical waveguide being configured for guiding the incoming light towards an eye of a user to make the image visible to the user.

BRIEF DESCRIPTION OF THE DRAWINGS

The present disclosure can be better understood with reference to the following description and drawings, given by way of example and not limiting the scope of protection, and in which.

DESCRIPTION OF EMBODIMENTS

According to the present principles, an optical device comprising at least one diffraction grating will be described. According to embodiments of the present disclosure, such an optical device can be used as a waveguide for AR/VR glasses for instance.

According to the present disclosure, the optical device presents a specific diffraction grating that can be used for in coupling light into the optical device and/or out coupling light from the optical device. According to the present principles, the diffraction grating is configured to diffract an incident light at a diffraction order having an absolute value equal to or greater than 2.

5.1 Diffraction Modes

Figure 1A:
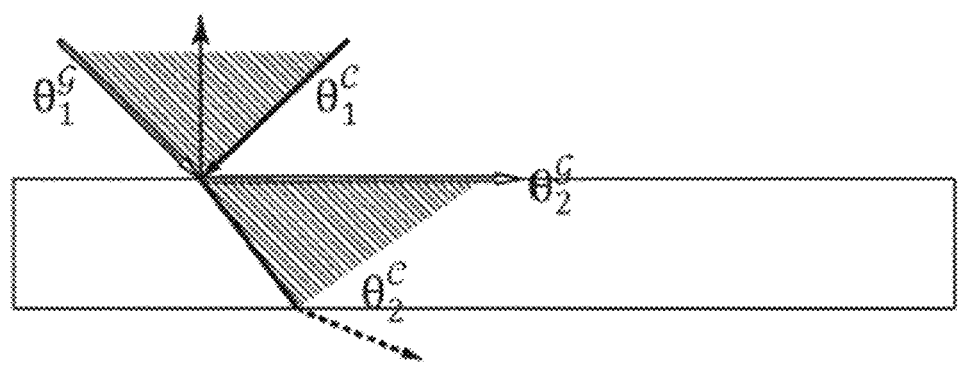
FIG. 1A illustrates the definition of theoretical critical and grazing rays in single mode.
Figure 1B:
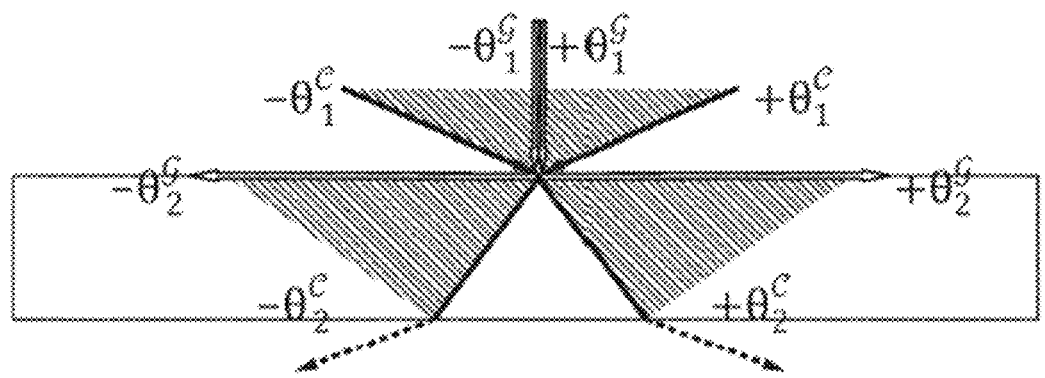
FIG. 1B illustrates the definition of theoretical critical and grazing rays in dual mode.
Figure 2:
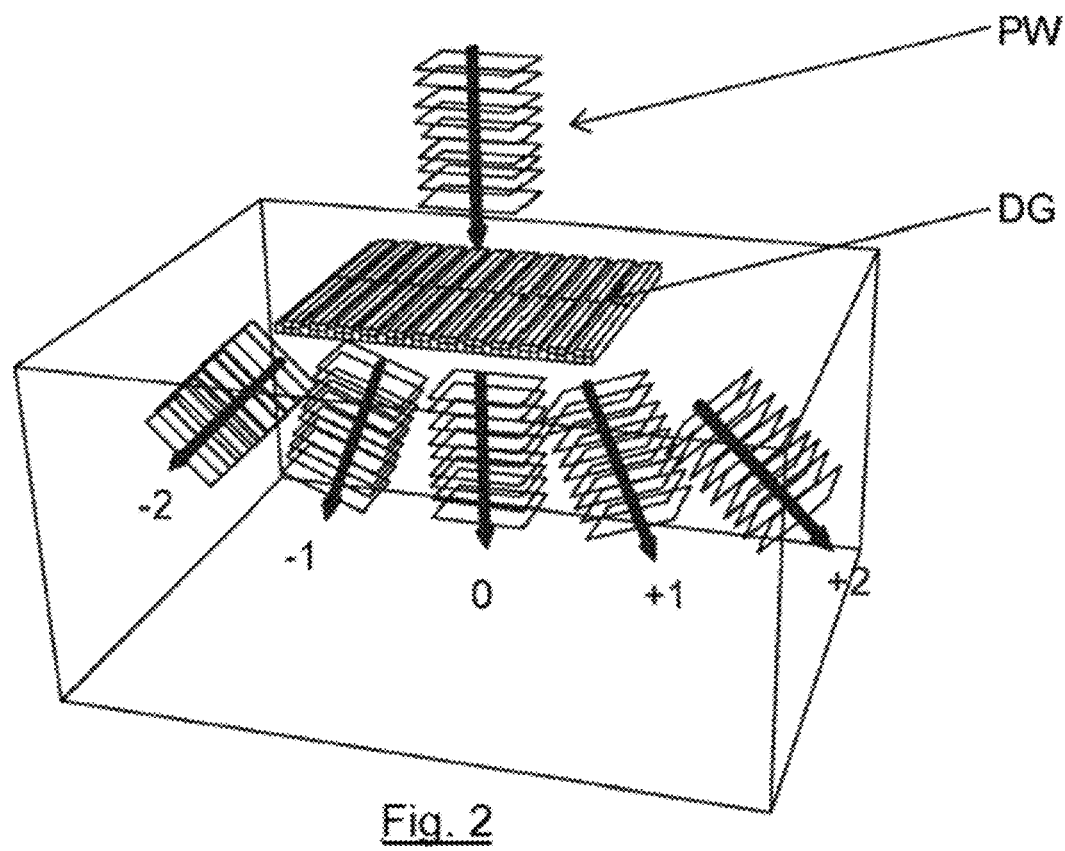
FIG. 2 illustrates diffraction modes of an incident plane wave.

FIG. 2 shows schematically what happens to a plane wave (PW) incident upon a linear grating (DG). The plane wave gets divided into diffraction modes (−2, −1, 0, +1, +2), which are angular spaced beams of local maximum intensity. While only diffracted modes number −2, −1, 0, 1 and 2 are represented, higher orders exist. The order zero has in general more power and is the natural mode into which the regular refraction or reflection would occur. Diffracted modes in reflection may also exist.

In general, a grating generates a lot of diffraction orders. In numerous applications, it is wishful to use only the first order and suppress all other modes. An example of such gratings are thick holograms made by the interference of two plane waves.

It is then the aim of the structure of the diffraction grating to privilege the first diffraction order and suppress as much as possible the remaining ones.

All diffraction orders are linked to the incoming beam by the following mathematical formula: $n_2(A)\sin\theta_2 - n_1(A)\sin\theta_i = M\lambda T$, where $n_1(A)$ and $n_2(A)$ are the indexes of refraction of the media into which light propagates respectively, where in most cases $n_1(A)=1$, $\theta_1$ is the incident angle, $\theta_2$ is the diffracted angle, M is the diffraction order, $\lambda$ is the wavelength and T is the grating frequency, which is expressed in lines per μm if the wavelength is also expressed in μm.

For the diffraction order M=0, this formula reduces to the well known Snell-Descartes's law of refraction. This equation does however not account for different phenomenons. Depending on the polarization of the input beam, on the geometry of the elementary structure used to build up the array, and on the materials used, there could be missing modes which have been reduced by destructive interference, or they can be very low, what the diffraction equation does not address. Furthermore, this equation does not account for the energy redistribution by the elementary structures.

5.2 Design Wavelengths

Usually, a light engine comprises light sources and one display. The light sources are power LEDs that are time sequentially driven. The design of the flat optics shall be adapted to the wavelengths of the LEDs. Examples of common LEDs for near to eye projection are: Blue 459 nm, True Green 530 nm, Red 625 nm The diffraction process is very dispersive. The diffraction angle is different for different wavelengths as it varies linearly with the wavelength (MλT) which is quite a big variation. It is therefore necessary to find a mean to minimize chromatic aberrations. One way of handling this is to have one waveguide per color b and because, for each color band, for instance Red, Green, Blue, the diffraction grating of each waveguide is configured differently depending on the color band. So if an RGB true color image is considered, three waveguides are necessary, which may complicate their design.

5.3 Over-Wavelength In-Coupling Grating Design

Figure 3:
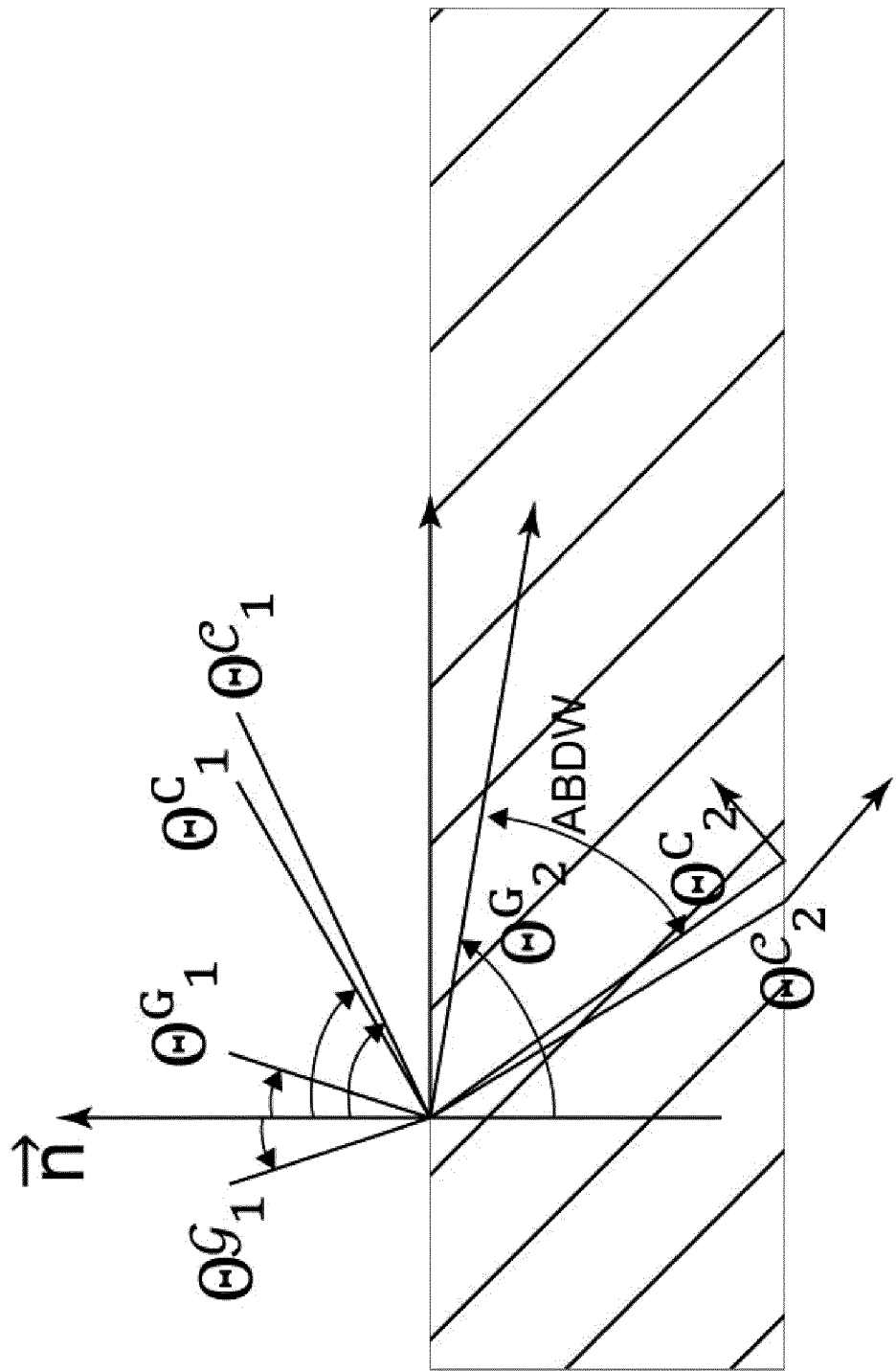
FIG. 3 illustrates the definition of important rays for the negative angular input space.

FIG. 3 shows the definition of some important rays used to characterize a waveguide. Capital superscript letters G and C indicate respectively the grazing and critical rays. If the subscript is 1, the rays are outside of the waveguide, if it is 2, they are inside. In principle, the maximal input angular bandwidth of the grating from the figure is $[\theta_1^C, \theta_1^G]$ and the maximal waveguides angular bandwidth is $[\theta_2^C, \theta_2^G]$. This being said, the ray $\theta_2^G$ is not a wishful option, as it is not possible to extract that ray. Hence, in practice, the angular bandwidth inside of the waveguide will be limited to $[\theta_2^C, \theta_2^G] \subset [\theta_2^C, \theta_2^G]$, (the angular sector indicated by ABDW on FIG. 3) which corresponds to the input angular range $[\theta_1^C, \theta_1^G] \subset [\theta_1^C, \theta_1^G]$.

Concerning angular sign convention, the positive angle measure is oriented in the trigonometrical direction, which means that $\theta_1^G > 0$ and all other $\theta_1^x < 0$ on the figure. Another convention: the diffracted rays on the figure have all positive values and the diffraction mode is a positive one, M>0.

If we apply the diffraction equation to the set of rays, we get the 4 following ones:

$$n_2 - n_1 \times \sin(\theta_1^G) = \frac{M \times \lambda}{d} \quad \text{(Eq. 2)}$$

$$1 - n_1 \times \sin(\theta_1^C) = \frac{M \times \lambda}{d}$$

$$n_2 \times \sin(\theta_2^G) - n_1 \times \sin(\theta_1^G) = \frac{M \times \lambda}{d} \quad \text{(Eq. 3)}$$

$$n_2 \times \sin(\theta_2^C) - n_1 \times \sin(\theta_1^C) = \frac{M \times \lambda}{d}$$

In order to choose the grating period d which can diffract the rays as illustrated in FIG. 3, it may be necessary to make some choices, particularly concerning the ray $\theta_2^G$ inside the waveguide. The choice may be based on the distance that the image has to travel in the waveguide before being extracted, on the number of TIR bounces and on the thickness of the waveguide.

For example, if there is a need to extract the image approximately 4 cm from the injection in the waveguide, this is the distance between the exit pupil of the light engine in the branches of glasses and the eye. Then, when supposing that the light engine and the eye are in the same half space with respect to the waveguide, this means that the extraction port is an even number. $x_1^{C,G}$ denotes the distance between a point of input of a critical ray or grazing ray inside the waveguide and a point at which the ray bounces on a face of the waveguide for the ith time. Index i represents a number of bounces of the ray inside the waveguide before extraction, i is also called the extraction port. If i is even, the extraction port is on the same side of the waveguide as the light engine and if i is odd, then the extraction port is on the opposite side of the waveguide with respect to the light engine. A way of using practically this definition of extraction port is to set a diffraction grating between the points $[x_2^C, x_2^G]$ whose result would be to gather the image out of the waveguide by diffraction between those two points. In other words, the image is gathered out at the second extraction port, i.e. the image is said to be extracted at port number 2.

According to an example where a field of view of 24 degrees for a glass substrate of index 1.5, is needed, some values useful for the design of a system may be defined in Table 1. Values in the column "Inputs" are suitable values which have been chosen for designing the system, while the values in the column "Calculated" are the parameters of the system which are obtained by using the "inputs" values.

TABLE 1

Parameters for the design of the grating

|  | Inputs | Calculated |
|---|---|---|
| index $n_2$ | 1.52 |  |
| Light engine field of View Δϕ° | 24 |  |
| Waveguide's field of View Δθ° |  | 30.14 |
| critical ray angle inside of the waveguide $\theta_2^C$ (0)° |  | 43.80 |
| grazing ray angle inside of the waveguide $\theta_2^G$ (0)° |  | 74.96 |
| Length incoupling grating L (mm) | 4.2 |  |
| minimal thickness of glass plate for light engine's field of view (mm) |  | 2.190 |
| minimal thickness of glass plate for waveguide's field of view (mm) |  | 2.404 |
| Thickness of prototype t (mm) | 2.4 |  |
| Extraction port number k | 6 |  |
| Beginning of the extraction port $x_k^C$ (0) (mm) |  | 13.810 |
| End of the extraction port $x_k^G$ (L) (mm) |  | 57.781 |
| Extraction port length $L_k$ (mm) |  | 43.971 |

In this exemplary typical system, a reasonable value for the grazing angle in the waveguide could be chosen to be between 60° and 90°, for instance the grazing angle is chosen approx. $\theta_2^G = 75°$, this value for the grazing angle makes it easier to be extracted from the waveguide But, the value of $\theta_1^C$ could also be chosen such that sin $$(\theta_1^C) \geq \frac{n_1}{n_2}.$$

Indeed, it is desirable to design a diffraction grating that diffracts all $\theta_1$ angles of a specific sign into one direction and the angles with the opposite sign into the opposite direction.

In this way, the waveguide will operate in dual mode according to which the field of view is split in half, one half of the field of view is directed (i.e. half of the image) into one direction and the other half into another direction with the positive consequence to double the field of view. This means that $\theta_1^G$ needs to be chosen with the same angle sign as $\theta_1^C$ and in the vicinity of the normal.

Another condition is that there should be no cross-talks between the positive and negative orders, which means that for a given orientation hitting the in-coupler, there shall always be one and only one direction of diffraction and no energy into the other direction. On FIG. 3, this condition is met for $\theta_1^G \geq 0$ and in order not to reduce the input field of view, $\theta_1^G = 0$ preferably. From the equation Eq.2 discussed above, the gratings pitch can be obtained as:

$$d = \frac{M \times \lambda}{n_2}. \qquad \text{(Eq. 4)}$$

By using the equation Eq. 3 discussed above, $\theta_1^G$ is obtained according to: $\sin(\theta_1^G) = n_2 \times [\sin(\theta_2^G) - 1]$.

The maximal angular span of the input beam for negative angles is $[\theta_1^C, \theta_1^G]$ which couples into the waveguide to span the angular bandwidth of $[\theta_2^C, \theta_2^G]$.

For $n_2 \in [3/2, 2]$, and considering the second diffraction order, $|M|=2$, the relationship between the pitch size anf wavelength is $d/\lambda \geq 1$ in any case, which means that the structure of the grating will be over-wavelength.

If, instead of coupling the first diffraction order into the waveguide, the grating's pitch is chosen in a manner to couple a higher order, the grating's pitch is greater and the very limits of the micro fabrication processes are avoided.

The table 2 shows the difference between a grating designed to couple second orders and a grating for first orders. The difference in pitch size is almost doubled. For the second diffraction orders, we get for the RGB in-couplers values of the pitch $d_{625=822.4}$ nm, $d_{530=697.4}$ nm, $d_{460=605.3}$ nm instead of the very small pitch sizes that are obtained for the first diffraction orders: $d_{625=411.2}$ nm, $d_{530=348.7}$ nm, $d_{460=302.7}$ nm.

The gratings using second diffraction order are called over-wavelength gratings as their pitch is always bigger than the wavelength of the color b and that they are designed for. The gratings using first diffraction order are called subwavelength gratings since their pitch is smaller than the wavelength of the color b and that they are designed for.

The field of view FoV in Table 2 is given for a system that uses both ±2 diffraction orders. It is twice the field of view of previous systems working in only one direction into the waveguide.

Using orders ±1 has the advantage of providing a symmetric response curve into both directions for the very lower diffraction orders, while emphasizing either order +1 or order −1 with very high diffraction efficiency and with high diffraction uniformity.

As discussed below, the nanojet based diffraction gratings disclosed herein allow to get symmetric response into ±2 diffraction orders with a very high diffraction uniformity, which is advantageous.

TABLE 2

| Grating's pitch and angular bandwith | | | |
|---|---|---|---|
| Index $n_2$ | 1.52 | 1.52 | 1.52 |
| Diffraction order M | 2 | 2 | 2 |
| Wavelength λ (nm) | 625 | 530 | 460 |
| $\theta_1^G$ (°) | −2.97 | −2.97 | −2.97 |
| grazing ray angle inside of the waveguide $\theta_2^G$ ($\theta_1^G$)(°) | 75 | 75 | 75 |
| Grating's period for 2nd order (nm) | 822.4 | 697.4 | 605.3 |

TABLE 2-continued

| Grating's pitch and angular bandwith | | | |
|---|---|---|---|
| Grating's period for 1st order (nm) | 411.2 | 348.7 | 302.7 |
| grazing incident angle for the real grazing ray in waveguide $\theta_1^g$ ($\theta_2^g = 90°$) | 0.00 | 0.00 | 0.00 |
| maximum input angle $\theta_1^C$ for diffraction order M | −31.33 | −31.33 | −31.33 |
| FoV | 56.73 | 56.73 | 56.73 |

Figure 4A:
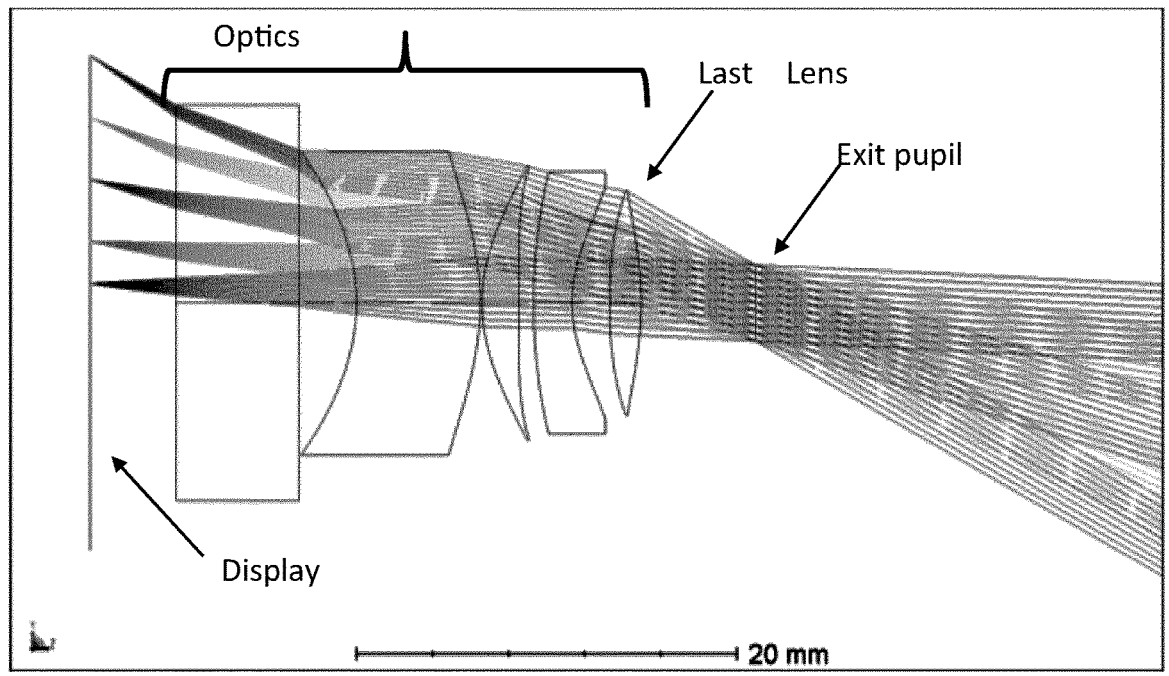
FIGS. 4A and 4B illustrate an exemplary 60° field of view light engine.
Figure 4B:
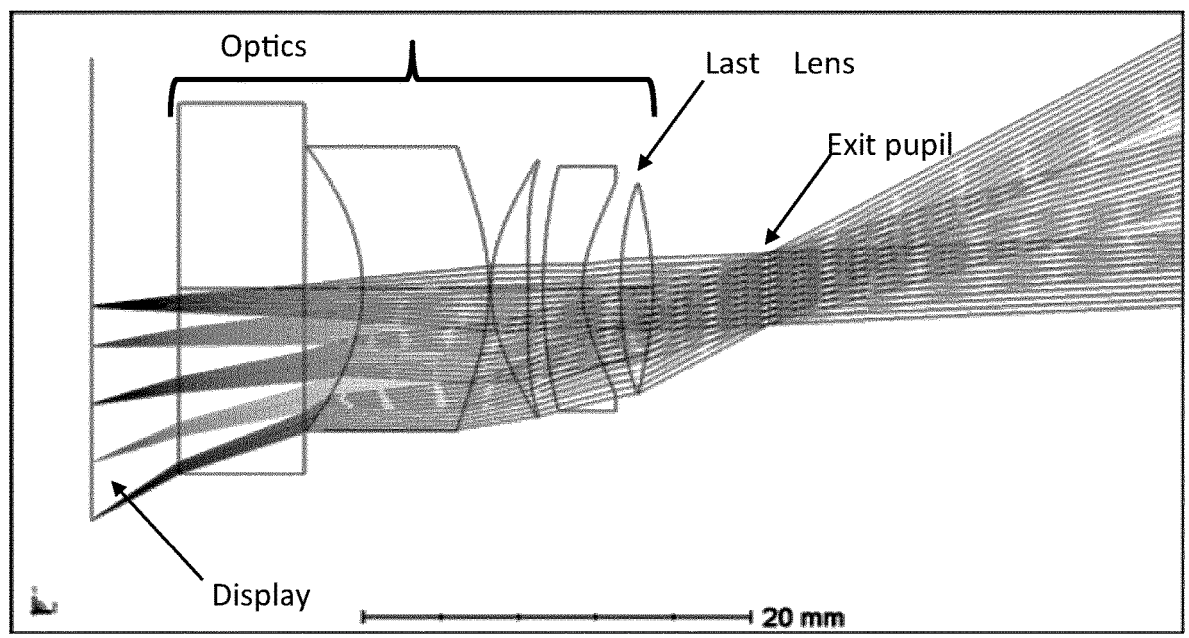

FIGS. 4A and 4B illustrate an exemplary schematic light engine providing a 60° field of view. The light engine comprises a display emitting incoming light to a set of optics that couples incoming light to an exit pupil placed at the last surface after the last lens of the set of optics, where the rays intersect into the smallest circular cross section.

Figure 5:
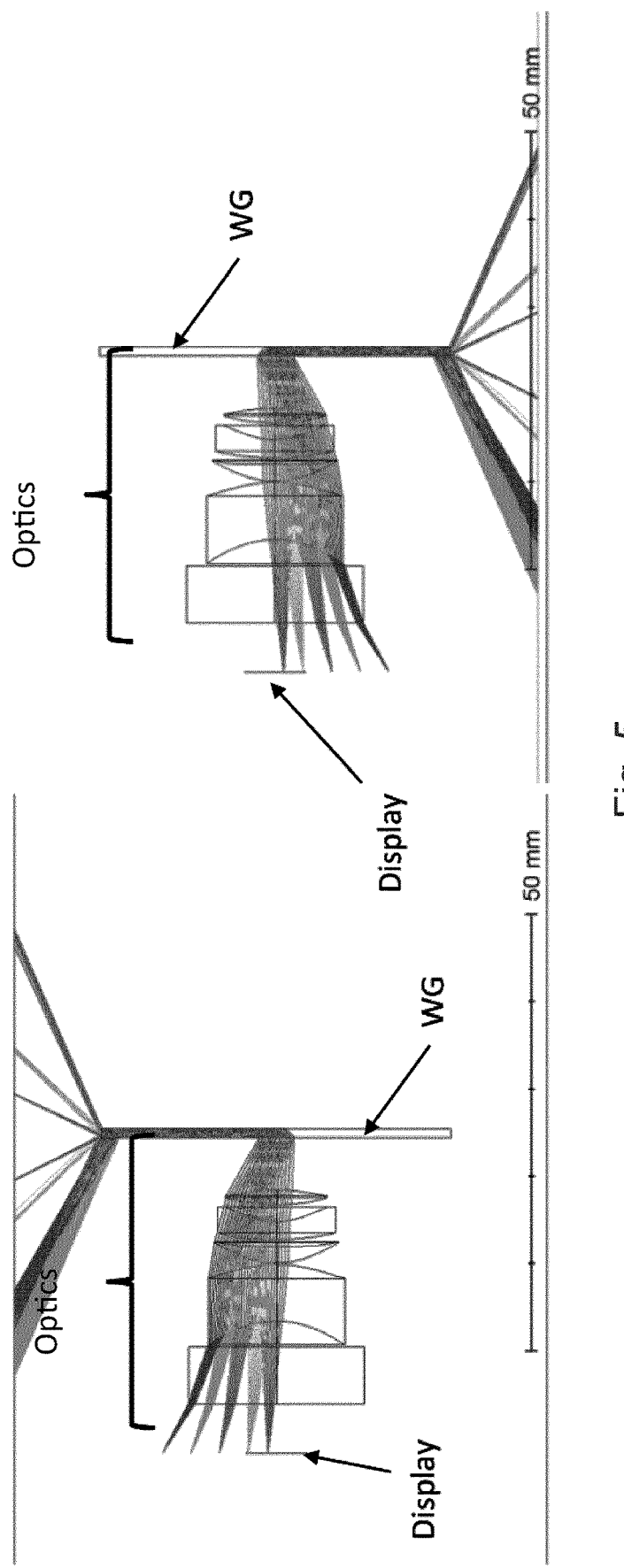
FIG. 5 illustrates a schematic view of the light engine from FIGS. 4A and 4B with the waveguide provided with the in-coupling grating.

As will be seen in FIG. 5, the diffraction grating is to be placed at the exit pupil. On FIG. 4A, only rays of negative incident angle go onto the in-coupling grating (exit pupil). These rays come from the upper part of the display. On FIG. 4B, only rays of positive incident angle go onto the in-coupling grating (exit pupil). These rays come from the lower part of the display.

FIG. 5 shows the light engine from FIGS. 4A and 4B with the waveguide (WG) provided with the in-coupling grating. Order M=2 is on the left hand side and order M=−2 is on the right hand side. Both ray paths exist at the same time if the display is ON. There is a ±2.97° angular range along the center horizontal part of the display from which light is not coupled into the waveguide. This part of the display shall always be black.

FIG. 5 is a schematic view of the light engine obtained from simulation. Only incoupling of incoming light into the waveguide is shown. On the simulated view, light rays are not extracted at output using extraction ports.

5.4 Nanojet Based Geometrical Elements for Dual-Mode and $2^{nd}$ Order Diffraction Gratings In all following subsections, different exemplary geometries will be presented that achieve high performances for the new principle presented in the present disclosure.

Also, a set of equations is presented to demonstrate the contribution of the edge diffraction phenomenon disclosed in "Near field focusing by edge diffraction", A. Boriskin, V. Drazic, R Keating, M. Damghanian, O. Shromkova, L Blondé, Optics Letters, vol. 43, Issue 16, pp 403-406(2018) in the case of a single element into the total response of the diffraction grating.

The presented data were obtained using the COMSOL Multiphysics software. The presented analysis of the fields and power distributions inside the so-called metaelements of the gratings helps to explain the physics of the edge diffraction phenomenon and to get optimal topologies, it is assumed that the system is illuminated by a linearly-polarized plane wave E={0, 0, 1}(TE). The effect of the parameters of the single metaelement on the functionality of the system is considered. As it was demonstrated in the document cited above, the nanojet (NJ) beam-forming phenomenon is associated solely with the edge of the system. Based on the analysis of the wedge diffraction phenomenon as disclosed in "Near field focusing by edge diffraction", a. Boriskin, V. Drazic, R Keating, M. Damghanian, O. Shramkova, L Blondé, Optics Letters, vol. 43, Issue 16, pp 4053-4056 (2018), the deviation angle of nanojet (NJ) beam in the denser medium can be obtained in the case of normal incidence of electromagnetic wave ($\theta_i = 90°$) by $$\theta_{NJ} \approx \frac{90° - \sin^{-1}\left(\frac{n_L}{n_H}\right)}{2}, \quad \text{(Eq. 5)}$$

where $n_L$ is the refractive index of the host medium, $n_H$ is the refractive index of the higher index material, according to an embodiment of the present disclosure.

In case of single wedge of single material element, the constructive interference phenomenon between a jet wave generated by the wedge and plane waves refracted by the edges of the wedge leads to the creation of an NJ beam.

It shall be also noted that in the following, unless specified otherwise, $n_1$ is the refractive index of the host medium, $n_2$ represents the refractive index of the high index material while $n_3$ represents a lower refractive index, for example the glass substrate's index.

5.2.1 Dual Material Solution with Insert

Figure 6:
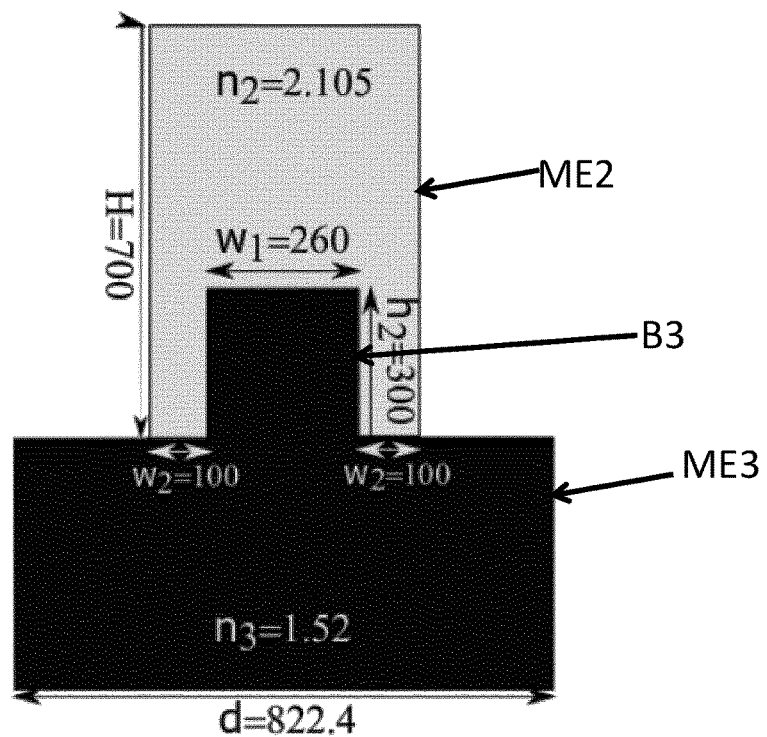
FIG. 6 illustrates an exemplary geometry and pitch size for a base pattern of the diffraction grating.

An exemplary geometry for a base pattern of a diffraction grating configured to diffract light at a diffraction order having an absolute value equal to or greater than 2 is disclosed in FIG. 6.

In FIG. 6, the base pattern comprises two dielectric materials: a block ME2 of dielectric material with refractive index $n_2$ placed on top of a layer ME3 of dielectric material with refractive index $n_3$. The layer ME3 presents a block B3 of the same dielectric material, the block B3 is inserted in the block ME2.

The structure from FIG. 6 has been optimized in order to deliver the best performances for the red wavelength at $\lambda = 625$ nm. Other slightly varying parameters could be used for a variable aspect of the diffraction curves. This structure is symmetrical, as it needs to feed a positive and a negative diffraction orders in a symmetric way.

In order to fabricate the structure, a glass etching is first needed to generate the first structure (layer ME3) into the waveguide's base material. Then an ebeam lithography resist in spin is coated on top of the structure and again exposed and etched to add the second component (ME2 block).

Both ME2 and ME3 components are dielectric transparent materials. This structure, as can be seen from the dimensions illustrated on FIG. 6, has a much bigger pitch than in the prior art: 822.4 nm instead of 496 nm. The aspect ratio is of 700/460=1.5 which is a low one, while the depth is not much bigger than the width.

Figure 7:
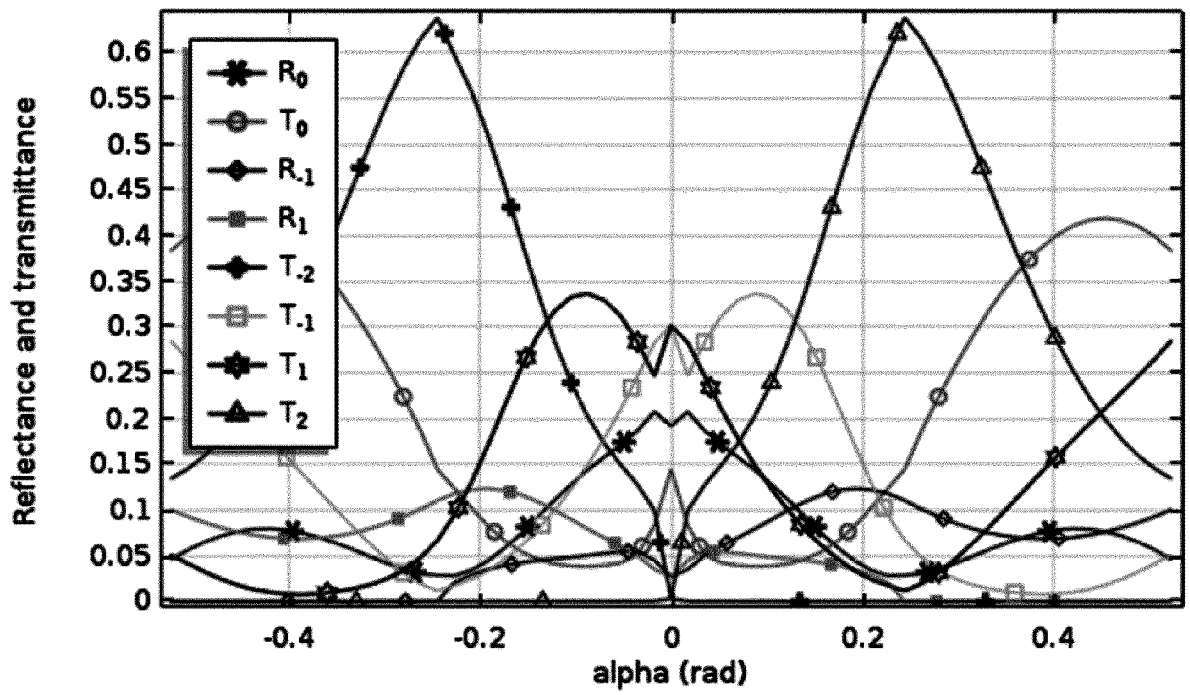
FIG. 7 illustrates diffraction performances of the grating structure illustrated in FIG. 6.

FIG. 7 illustrates the diffraction performances of the grating illustrated on FIG. 6. It shows that $$\eta_{max} \approx 65\%, \Gamma \approx 1 - \frac{65-15}{65+15} \approx 37\%,$$

for a field of view of $2 \times (30° - 3°) = 54°$. There is absolutely no cross-talk between orders +2 and −2 per design. It shall be avoided at this design phase to have some angles which diffract into both +2 and −2 orders. Orders 0, +1 and −1 do not couple into the waveguide. They transmit through it and thus do not reduce the virtual image contrast projected by a light engine display.

Figure 8:
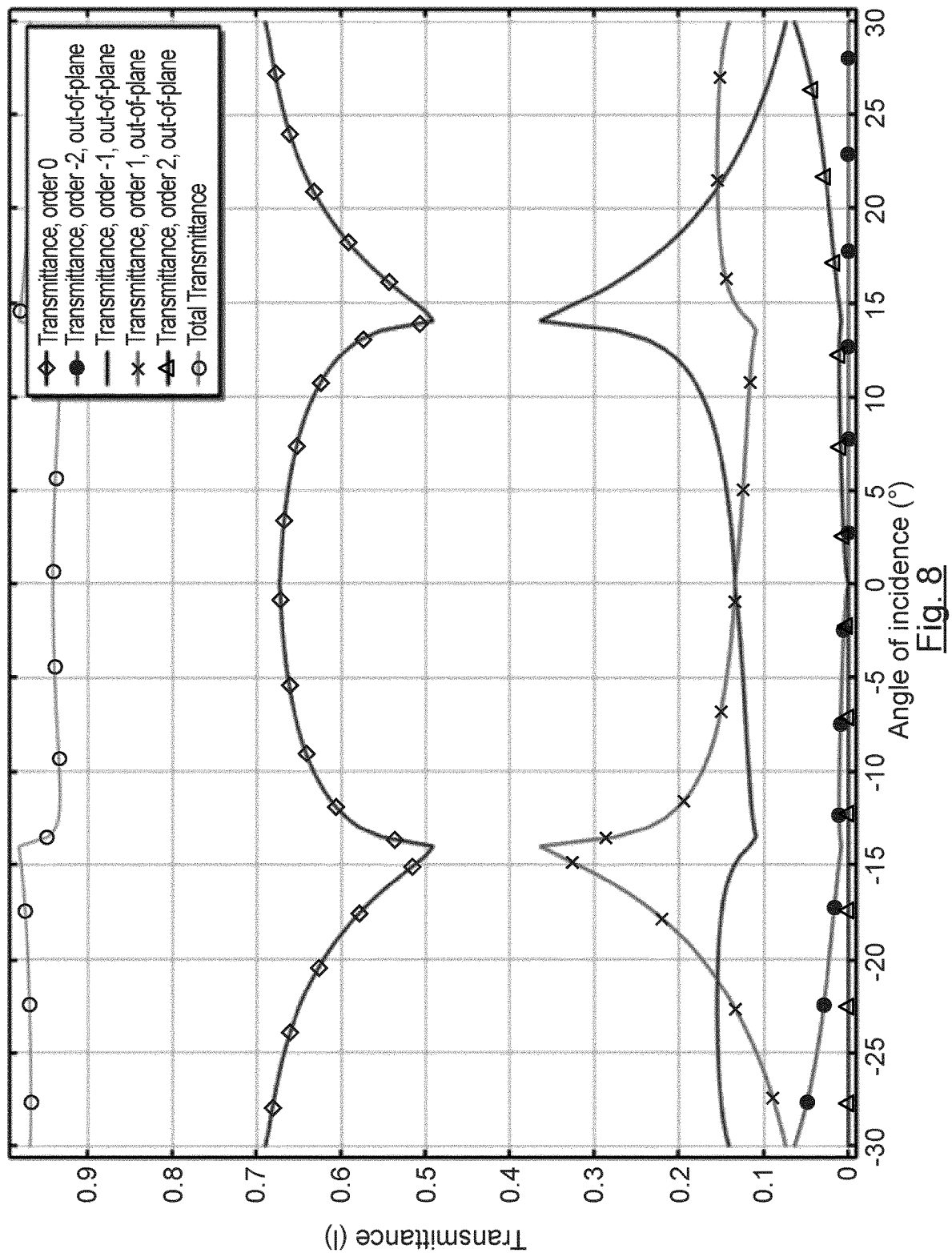
FIG. 8 illustrates diffraction performances of the grating structure illustrated in FIG. 6 without the high index material.

In FIG. 7, the diffraction uniformity is of the same order as the prior art systems while second diffraction order is used instead of the first diffraction order. A very high diffraction efficiency is obtained as emphasized in FIG. 8 representing the diffraction efficiency of the same system without nanojet enhancement (i.e. the high index material ME2 is removed to keep only the etched waveguide). As can be seen on FIG. 8, the diffraction efficiencies of +2 and −2 orders in that case are marginal.

Figure 9:
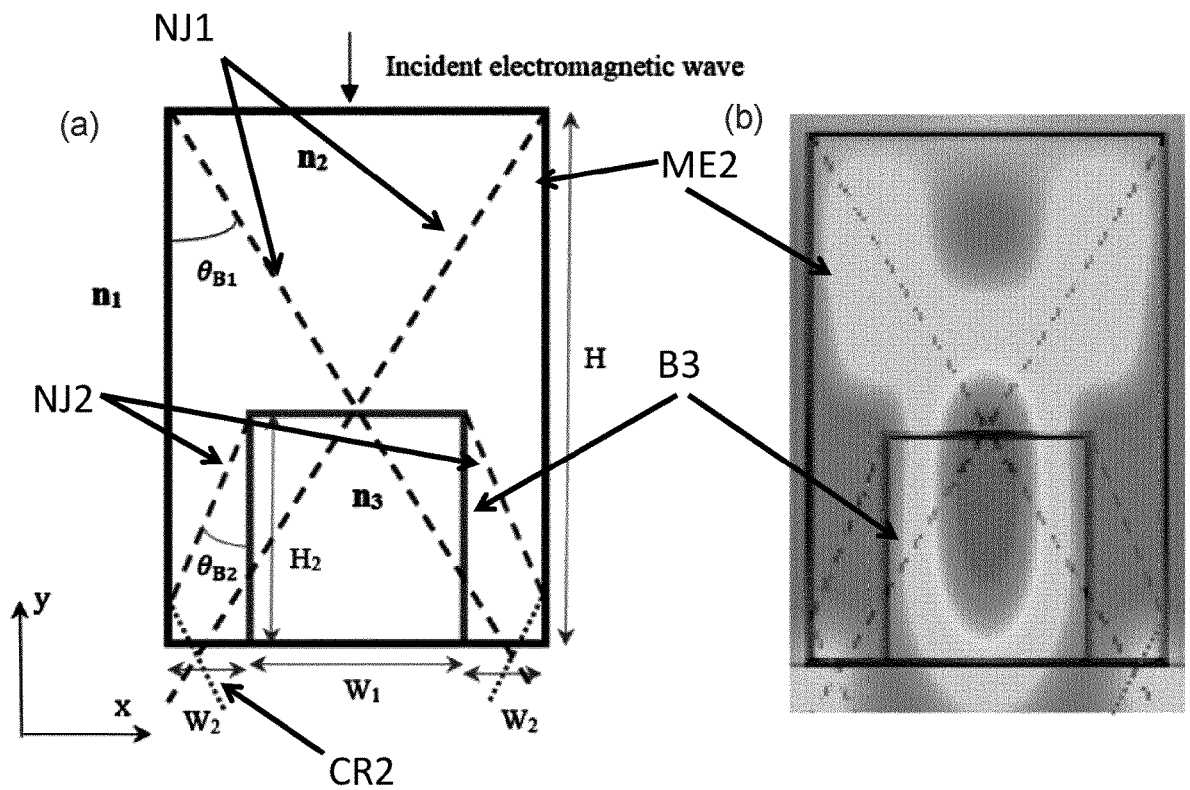
FIG. 9 illustrates (a) a Cross-section view of a double-material metaelement with an insert as illustrated in FIG. 6; (b) Power density distribution in the xy-plane for the metaelement with the parameters: $n_1=1.0$, $n_2=2.105$, $W_1=260$ nm, $W_2=100$ nm, H=700 nm, $H_2=300$ nm, $\lambda=625$ nm, $\theta_i=0°$.

FIG. 9 illustrates (a) a cross-section view of a double-material metaelement with the insert as illustrated in FIG. 6 for instance, and (b) the power density distribution in the xy-plane for such a metaelement with the parameters: $n_1 = 1.0$, $n_2 = 2.105$, $W_1 = 260$ nm, $W_2 = 100$ nm, $H = 700$ nm, $H_{2=300}$ nm. $\lambda = 625$ nm, $\theta_i = 0°$.

The symmetrical metaelement combines a dielectric block with refractive index $n_3$, width $W_1$ and height $H_2$ inside a dielectric block with refractive index $n_2$, width $2W_2 + W_1$ and total height H (as illustrated in FIG. 9). It is assumed that $n_1$ is the refractive index of the host medium and $n_1 < n_2 < n_3$. As a result, in the proposed system for $\theta_i = 0°$ ($\theta_i$ is the angle of incidence) we will observe radiation of 4 nanojets with deviation angles $$\theta_{B1} \approx \frac{90° - \sin^{-1}\left(\frac{n_1}{n_2}\right)}{2}, \theta_{B2} \approx \frac{90° - \sin^{-1}\left(\frac{n_3}{n_2}\right)}{2}$$

For the proposed symmetrical system, two opposite edges of the block (ME2 in FIG. 9(a) generates 2 nanojets propagating inside the block ME2 with refractive index $n_2$ with radiation angles $\theta_{B1}$ (NJ1, see dashed lines starting at top edges of block ME2 in FIG. 9(a)). The hot spot of power distribution inside the metaelement in FIG. 9(b) corresponds to the crossing point of these two NJs. It shall be noted that in this cross-section view of FIG. 9, the refraction phenomenon at the boundaries between the insert B3 and the main block ME2 is not considered.

A second couple of NJs with radiation angles $\theta_{B2}$ inside the block ME2 with the refractive index $n_2$ is generated by the edges of the central block B3 with refractive index $n_3$ (NJ2, see dashed lines starting at top edges of block B3 in FIG. 9(a)). The propagation direction of these NJs is changed due to the total internal reflection of the waves at the vertical edges of the block ME2. As a result, at the bottom surface of the metaelement, we can observe two less intensive hot spots in the crossing points of NJ1 and NJ2 (crossing points of the dashed lines NJ1 and NJ2 on each side of the block B3 referenced CR1 and CR2).

Figure 10:
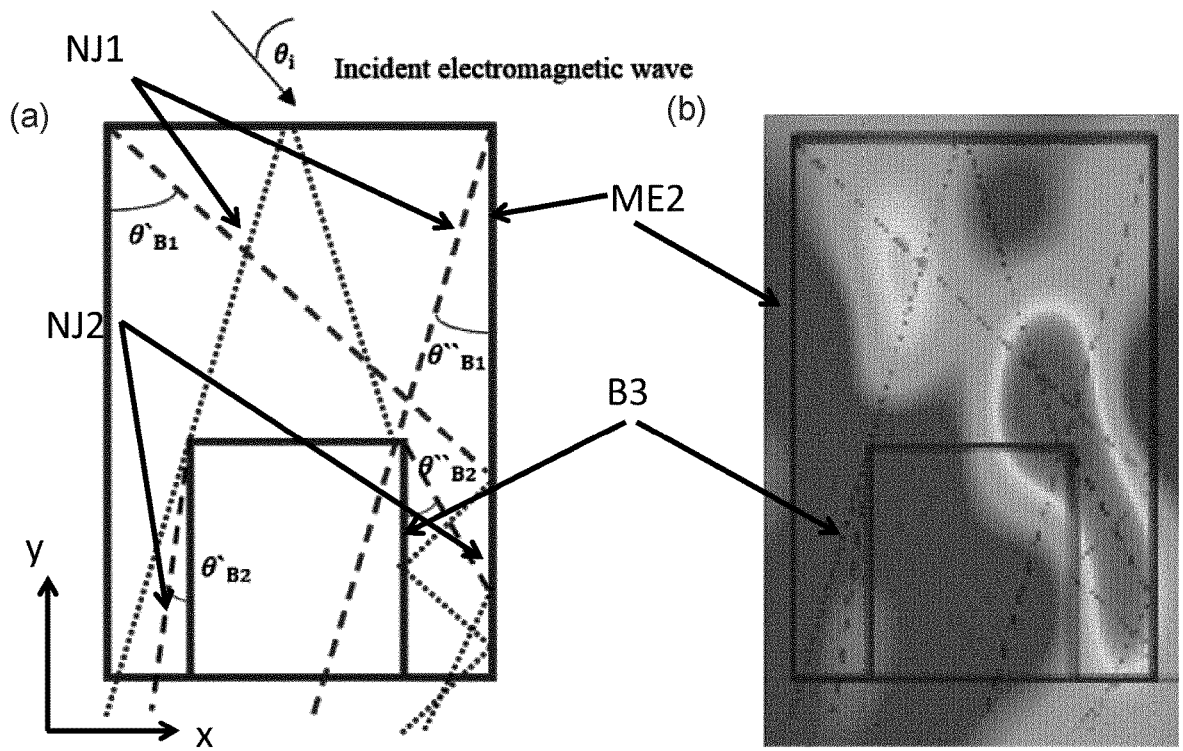
FIG. 10 illustrates (a) a Cross-section view of a double-material metaelement with an insert as illustrated in FIG. 6; (b) Power density distribution in the xy-plane for the metaelement with the parameters: $n_1=1.0$, $n_2=2.105$, $W_1=260$ nm, $W_2=100$ nm, H=700 nm, $H_2=300$ nm, $\lambda=625$ nm, $\theta_i=30°$.

FIG. 10 illustrates (a) the cross-section view of a double-material metaelement with an insert, for instance as the one illustrated in FIG. 6, and (b) the power density distribution in the xy-plane for the metaelement with the parameters: $n_1 = 1.0$, $n_2 = 2.105$, $W_1 = 260$ nm, $W_2 = 100$ nm, $H = 700$ nm, $H_{2=300}$ nm. $\lambda = 625$ nm, $\theta_i = 30°$.

The radiation angles $\theta'$ and $\theta''$ for opposite edges of the system are not equal (see FIG. 10(a)). As a result, for the block ME2:

$$\theta'_{B1} \approx \theta_{B1} - \frac{\theta_i}{2}, \theta''_{B1} \approx \theta_{B1} + \frac{\theta_i}{2}.$$

In a similar way, the nanojets beam radiation angles for the insert (block B3) can be determined as:

$$\theta'_{B2} \approx \theta_{B2} - \frac{\theta_i}{2}, \theta''_{B2} \approx \theta_{B2} + \frac{\theta_i}{2}.$$

The reflection of the generated waves at the edges of the constitutive parts of the metaelements leads to the creation of the new NJ hot spots (cross points) and nonsymmetrical redistribution of the total power inside the metaelements, as can be seen with FIG. 10(b).

Figure 11:
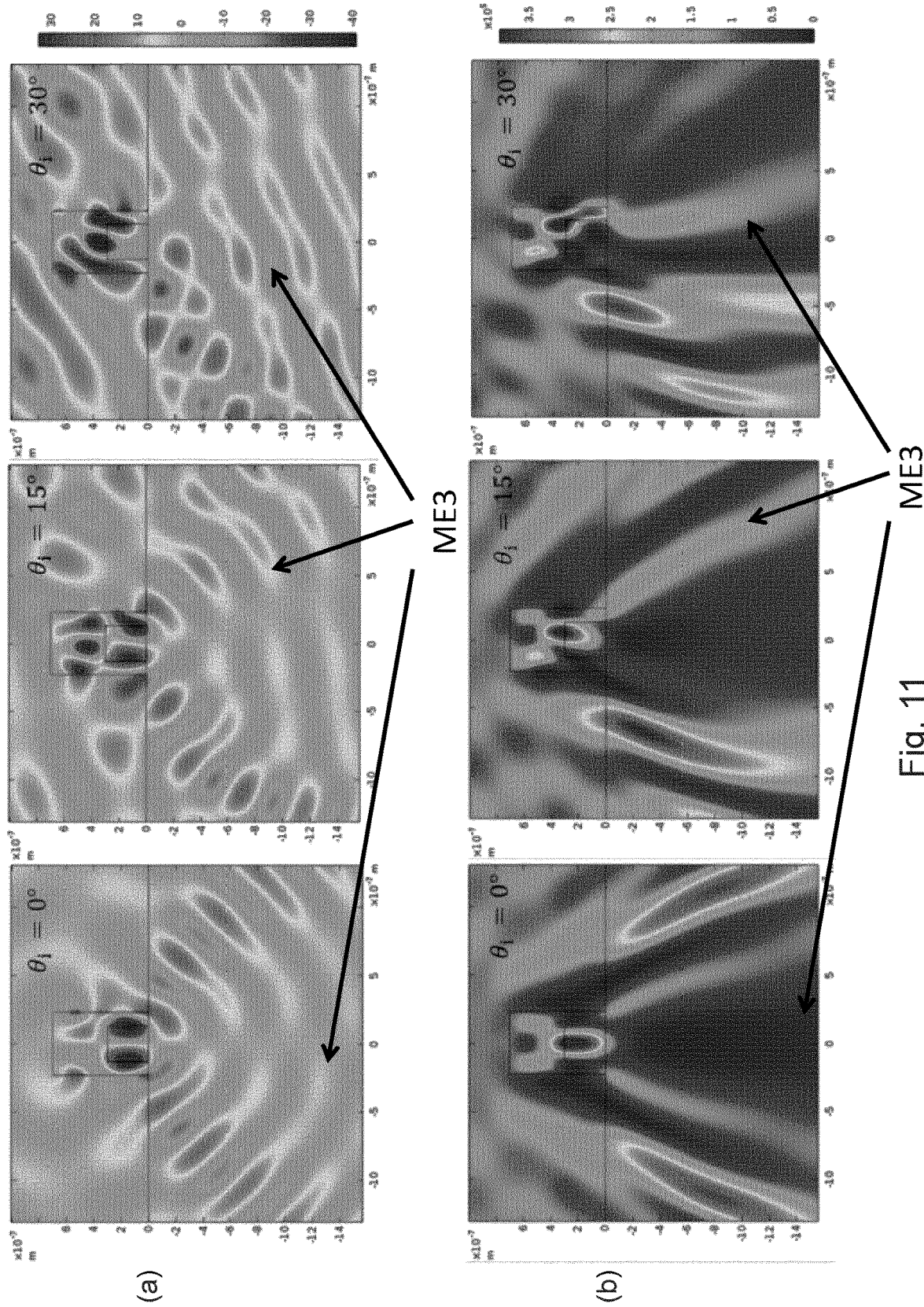
FIG. 11 illustrates (a) Hy component distribution and (b) power density distribution in the xy-plane for the metaelement illustrated in FIG. 6 with the parameters: $n_1=1.0$, $n_2=2.105$, $n_{3=1.52}$, $W_1=260$ nm, $W_2=100$ nm, H=700 nm, $H_2=300$ nm, $\lambda=625$ nm.

The blocks ME2 and B3 are put onto a substrate ME3 with refractive index $n_3$ as illustrated with FIG. 6. FIG. 11(a) illustrates the Hy component field distribution (i.e. the distribution corresponding to the projection of the magnetic field on the y axis) and FIG. 11(b) shows the power density distribution in the xy-plane for the metaelement as illustrated in FIG. 6, with the parameters: $n_{1=1.0}$, $n_2$=2.105, $n_{3=1.52}$, $W_1$=260 nm, $W_2$=100 nm, H=700 nm, $H_2$=300 nm. λ=625 nm, for three different angles of incidence $θ_i$.

Below the metaelement, NJs are obtained inside the substrate (ME3) after the corresponding wave refraction at the substrate surface. The power distribution presented in FIG. 11(b) shows the intensive lobes inside the substrate generated from wave interference. The constructive interference between the refracted waves obtained from wedge diffraction of the periodic array of metaelements leads to the redistribution of the power between corresponding orders of diffraction. The central insert (B3) with lower refractive index helps to almost fully suppress the intensity of 0-diffraction order in a case of normal incidence and to dramatically decrease it in the case of inclined incidence. Furthermore, the presented topology helps to change the direction of propagation of the waves diffracted by the wedges of the elements of diffraction grating and to increase the intensity of $±2^{nd}$ diffraction orders (see FIG. 7).

5.2.2 Dual Material and Equal Height Insert

The structure from FIG. 6 is not the only one that could be used in order to achieve right performances, even if it might be a preferred one for the micro-fabrication process. Another geometry for the base pattern according to another embodiment, is depicted on FIG. 12. Such a geometry can achieve comparable performances In the embodiment illustrated in FIG. 12, the base pattern comprises a block B3 of same dielectric material with refractive index $n_3$ as the material of the substrate ME3. The block B3 is placed on top of the substrate ME3 and between two blocks ME21 and ME22 of dielectric material with refractive index $n_2$. The blocks B3, ME21 and ME22 have identical heights.

Figure 12:
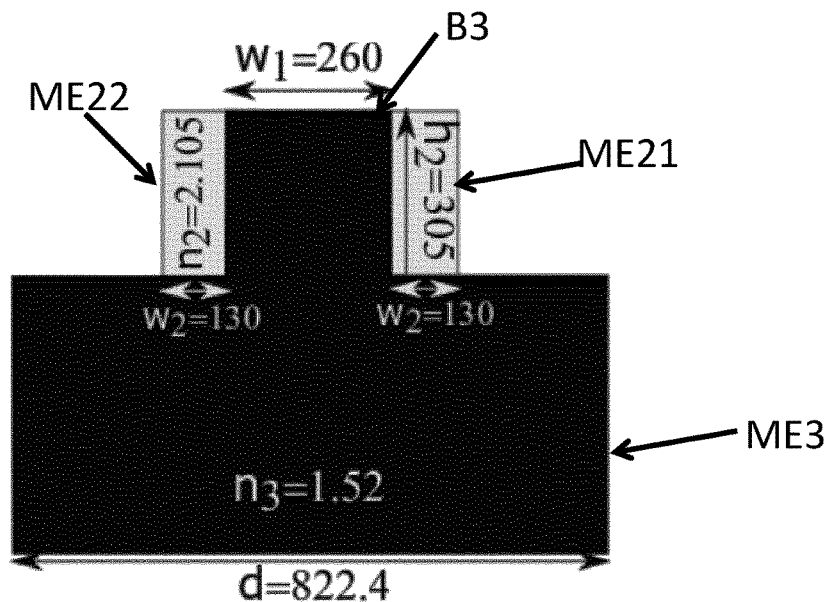
FIG. 12 illustrates an exemplary geometry and pitch size for an alternative embodiment of a base pattern of a diffraction grating.

Numerical values indicated in FIG. 12 have been optimized for a wavelength of 625 nm. However, slightly different values may be used for the wavelength of 625 nm. Also, other numerical values could be used for other wavelengths, as long as the grating pitch d is above the wavelength of the light that it is dedicated to diffract.

Figure 13:
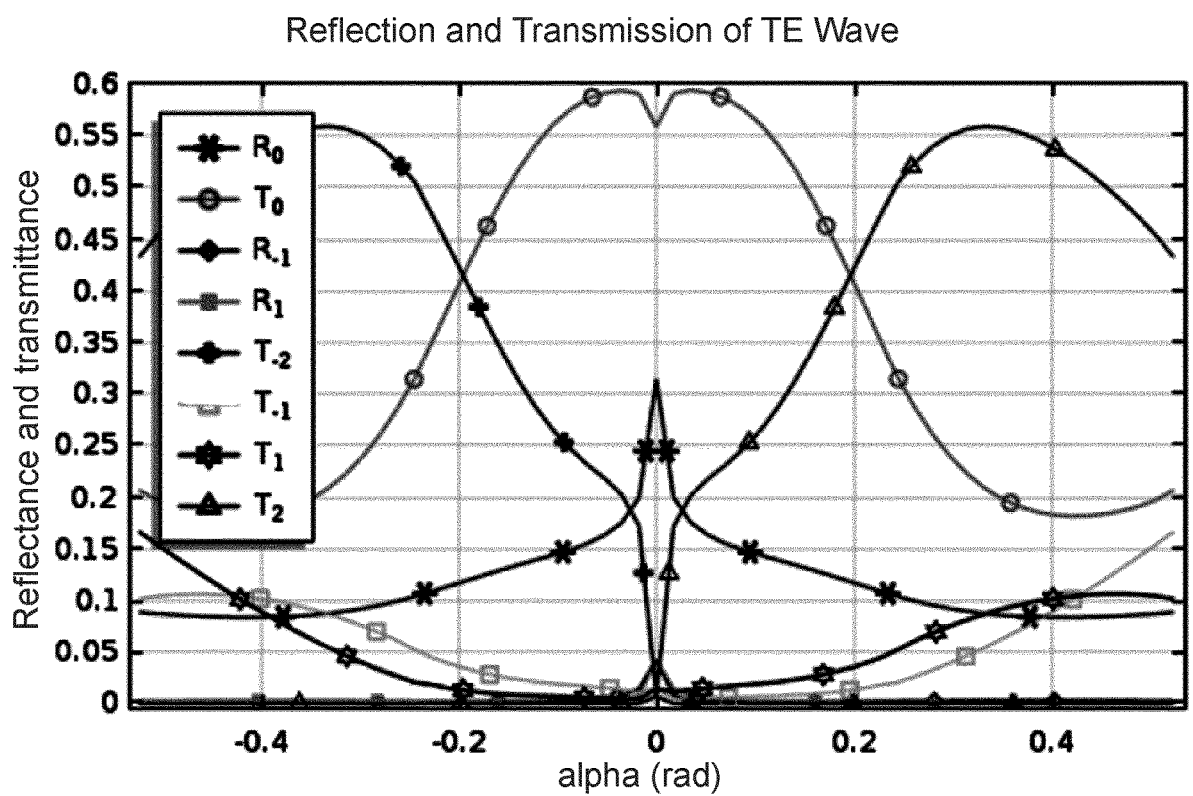
FIG. 13 illustrates the performance of a grating based on the geometry illustrated in FIG. 12.

FIG. 13 illustrates performances of a diffraction grating based on the geometry from FIG. 12.

As can be seen from FIG. 13, The maximum diffraction efficiency is of 55 percent which may be considered as low. By using a material having a higher value of $n_2$ (2.3 to 2.5), the efficiency will increase significantly. The value used of $n_2$=2.105 is based on available silicon nitride e-beam lithography compatible material.

When considering the symmetrical metaelement combining the block with refractive index $n_3$, width $W_1$ and height H placed between 2 similar blocks with the refractive index $n_2$, width $W_2$ and total height H, as illustrated in FIG. 12, a nanojet analysis of the energy transfer to higher orders can be performed.

It is assumed that $n_1$ is the refractive index of host medium and $n_1$<$n_2$<$n_3$.

Figure 14A:
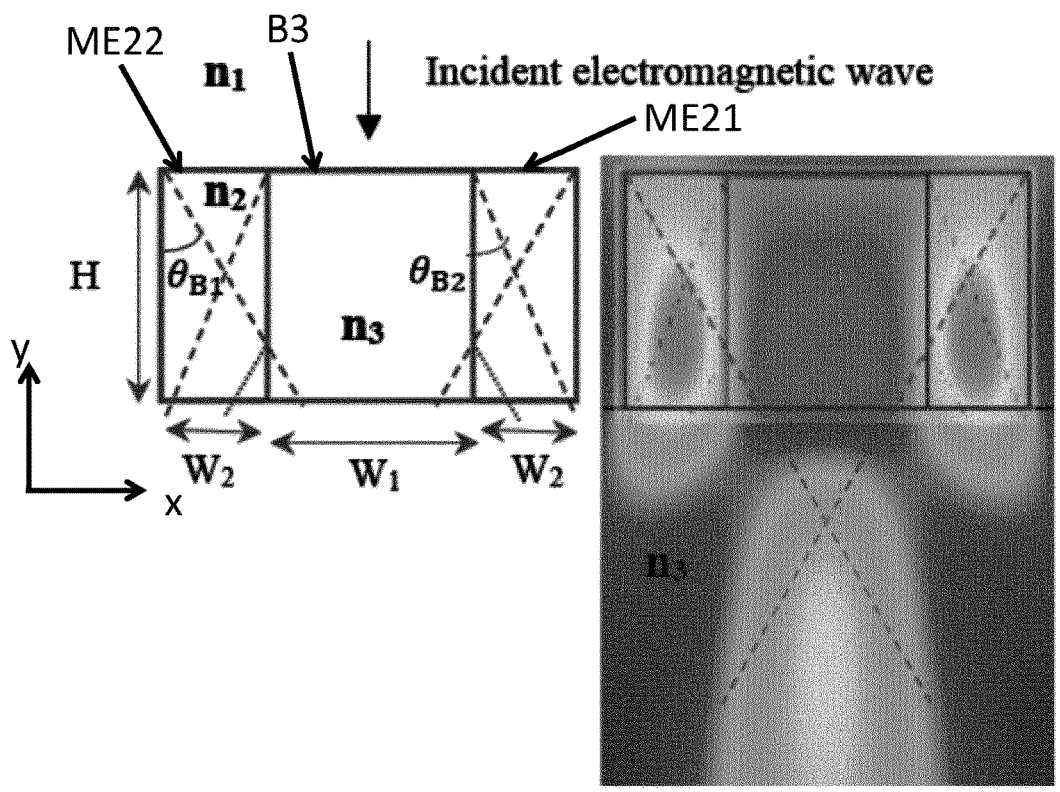
FIG. 14A illustrates a cross-section view of a double-material metaelement with equal height insert (left part) and power density distributions in the xy-plane for the metaelement (right part) with the parameters: $n_1=1.0$, $n_2=2.105$, $n_{3=1.52}$, $W_1=260$ nm, $W_2=130$ nm, H=305 nm, $H_2=300$ nm, $\lambda=625$ nm and $\theta_i=0°$.
Figure 14B:
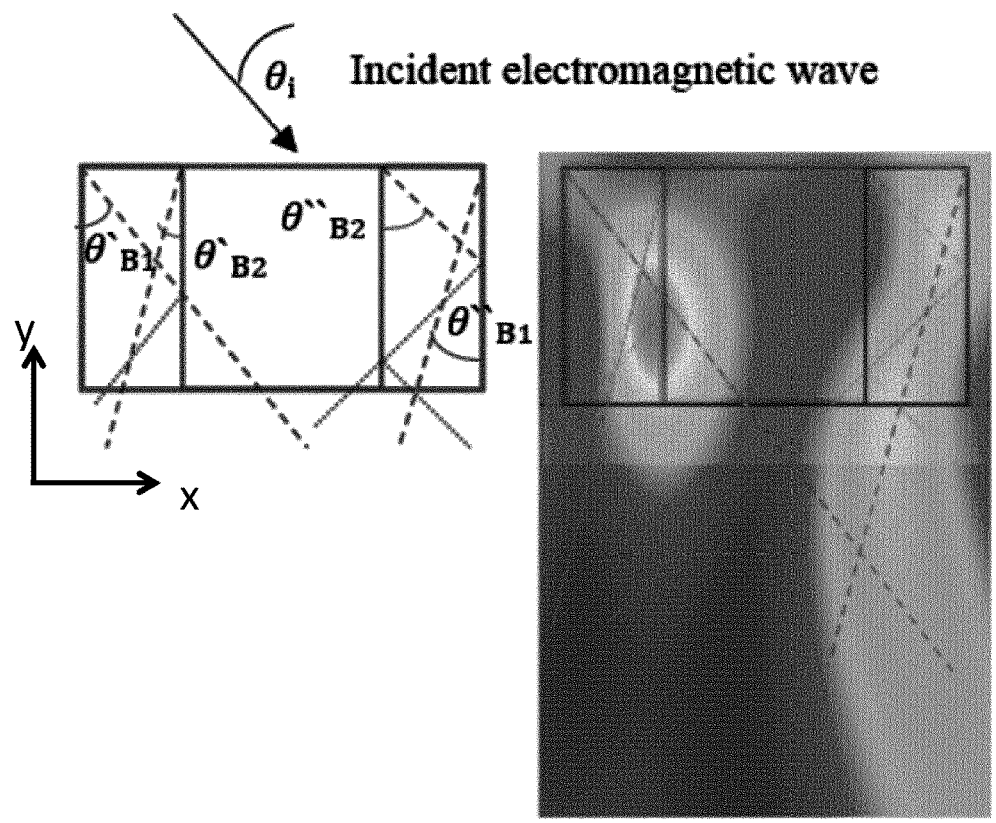
FIG. 14B illustrates a cross-section view of a double-material metaelement with equal height insert (left part) and power density distributions in the xy-plane for the metaelement (right part) with the parameters: $n_1=1.0$, $n_2=2.105$, $n_{3=1.52}$, $W_1=260$ nm, $W_2=130$ nm, $H=305$ nm, $H_2=300$ nm, $\lambda=625$ nm and $\theta_i=30°$.

FIGS. 14A and 14B illustrate the cross-section views of a double-material metaelement comprising two blocks ME22 and ME21 having refractive index $n_2$ and a block insert B3 with refractive index $n_3$, the three blocks ME22, ME21 and B3 having equal heights (left part of FIG. 14A) and power density distributions in the xy-plane (right part of FIG. 14A) for the metaelement with the parameters: $n_1$=1.0, $n_2$=2.105, $n_{3=1.52}$, $W_1$=260 nm, $W_2$=130 nm, H=305 nm, $H_2$=300 nm. λ=625 nm and $θ_i$=0' (normal incidence) for FIG. 14A and $θ_i$=30° for FIG. 14B.

As a result, in case of normal incidence (FIG. 14A), two NJs are generated respectively by the external edge between the medium ME21 with refractive index $n_2$ and the host medium with refractive index $n_1$ on one hand and between the medium ME22 with refractive index $n_2$ and the host medium with refractive index $n_1$ on the other hand. The two NJs beams propagate respectively at the angles $θ_{B1}$.

Two NJs are generated respectively at the edge between the block ME22, or respectively the block ME21, with refractive index $n_2$ and the block B3 with refractive index $n_3$. The two NJs propagate respectively at the angle $θ_{B2}$ (see dashed lines in FIG. 14A).

Two hot spots of power distribution inside the similar blocks (ME21, ME22) with refractive index $n_2$ in FIG. 14A correspond to the crossing points of two NJs with different radiation angles. The transmission of jet waves diffracted by the external wedges into the central part (insert B3) of the metaelement leads to the creation of a new hot spot outside the structure along the axis of the symmetry of the metaelement.

It shall be noted that the represented schematic distribution of the NJs does not take into account the refraction phenomenon leading to the shift of the NJs' crossing point along the axis of the symmetry. The existence of such NJ hot spot for each metaelement explains the high intensity of 0-diffraction order in a case of normal incidence (see FIG. 13).

Figure 15:
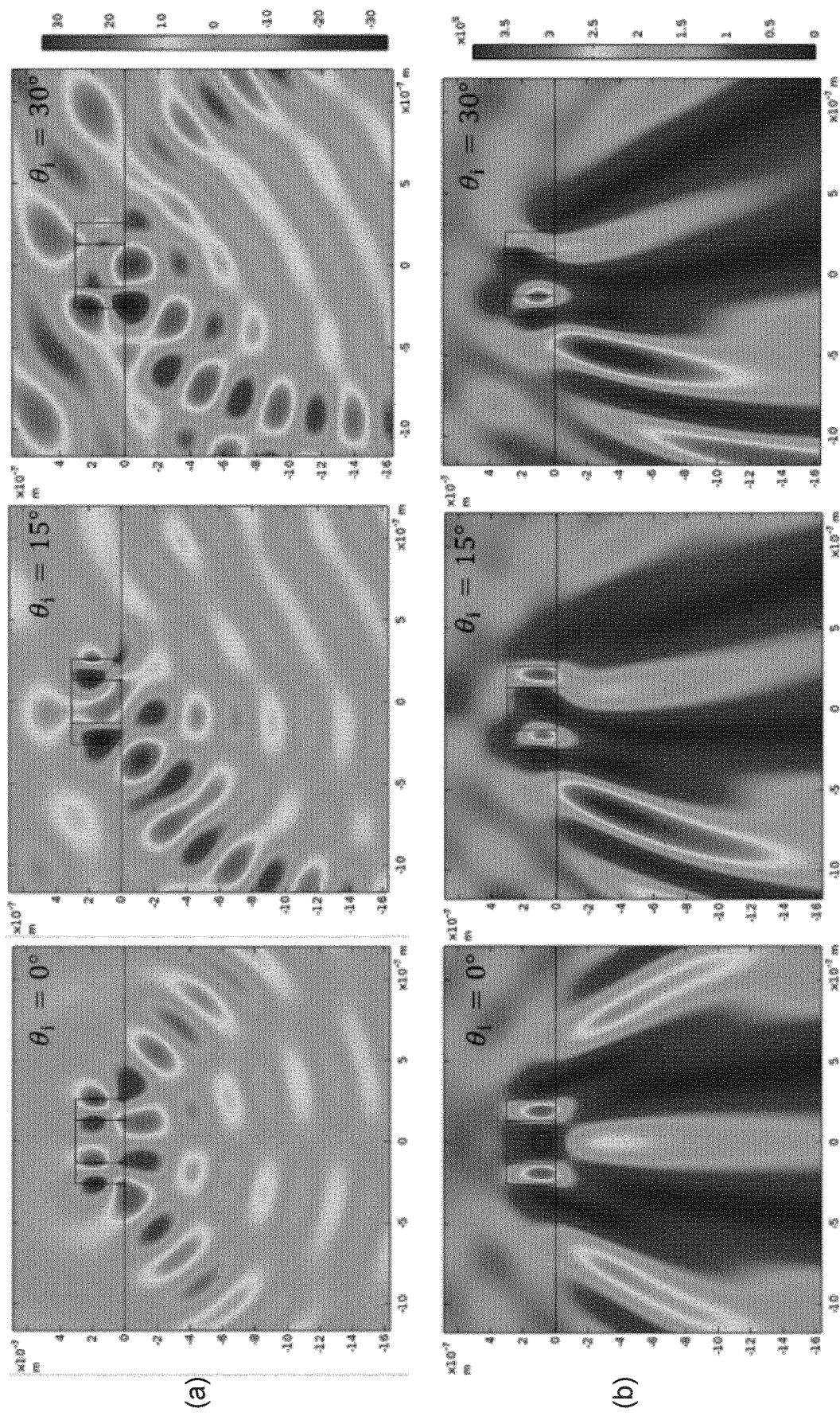
FIG. 15 illustrates (a) Hy component distribution and (b) power density distribution in the xy-plane for the metaelement illustrated in FIG. 12 with the parameters: $n_1=1.0$, $n_2=2.105$, $n_{3=1.52}$, $W_1=260$ nm, $W_2=130$ nm, $H=305$ nm, $H_2=300$ nm, $\lambda=625$ nm.

FIG. 15(a) illustrates the Hy component field distribution and FIG. 15(b) illustrates the power density distribution in the xy-plane for a metaelement as illustrated in FIG. 12, with the parameters: $n_1$=1.0, $n_2$=2.105, $n_{3=1.52}$, $W_1$=260 nm, $W_2$=130 nm, H=305 nm, $H_2$=300 nm. λ=625 nm, for three different angle of incidence, when the geometry structure illustrated in FIG. 12 is placed with a substrate of dielectric material having a refractive index $n_3$.

By changing the angle of electromagnetic wave incidence from 0 to +30 degrees, the waves diffracted by the internal wedges (wedges of the inserts) transmit into the substrate (see FIG. 15(a)) and make an input into the $2^{nd}$ diffraction order. The power distribution presented in FIG. 15(b) shows intensive lobes inside the substrate generated from diffracted waves' interference. For the negative angles of incidence, there is an intensification of $±2^{nd}$ diffraction order. As in the case of the metaelements with the inserts (FIG. 6), the total internal reflection phenomenon plays a crucial role by changing the direction of propagation of diffracted waves and leading to the redistribution of the power between corresponding diffraction orders.

5.2.3 Twin Structure

Figure 16:
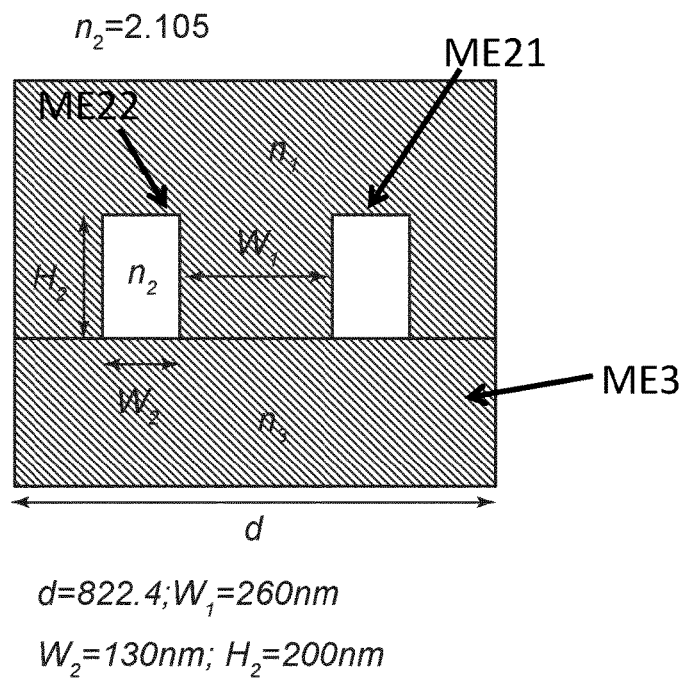
FIG. 16 illustrates another exemplary geometry for a base pattern of a diffraction grating according to an embodiment of the present disclosure.

FIG. 16 illustrates a base pattern according to another embodiment of the present principle. In this embodiment, the base pattern of the structure is based on a high index single material having a refractive index $n_2$ deposited and e-beamed on a glass substrate ME3 having a refractive index $n_3$. According to the present embodiment, this results in two blocks ME21 and ME22 of a single material having refractive index $n_2$ and having the same dimensions placed on top of the substrate ME3 and separated by a determined distance $W_1$. The space separating the two blocks ME21 and ME22 is naturally filled with the host medium (having the refractive index $n_1$).

For this geometry, there is no glass etching required, and no multiple e-beam lithography, which is advantageous for micro-fabrication. The structures are also very shallow with a height $H_2$ of 200 nm in the example presented here, much less than in the embodiment illustrated in FIG. 6 which has a height of 700 nm.

Figure 17:
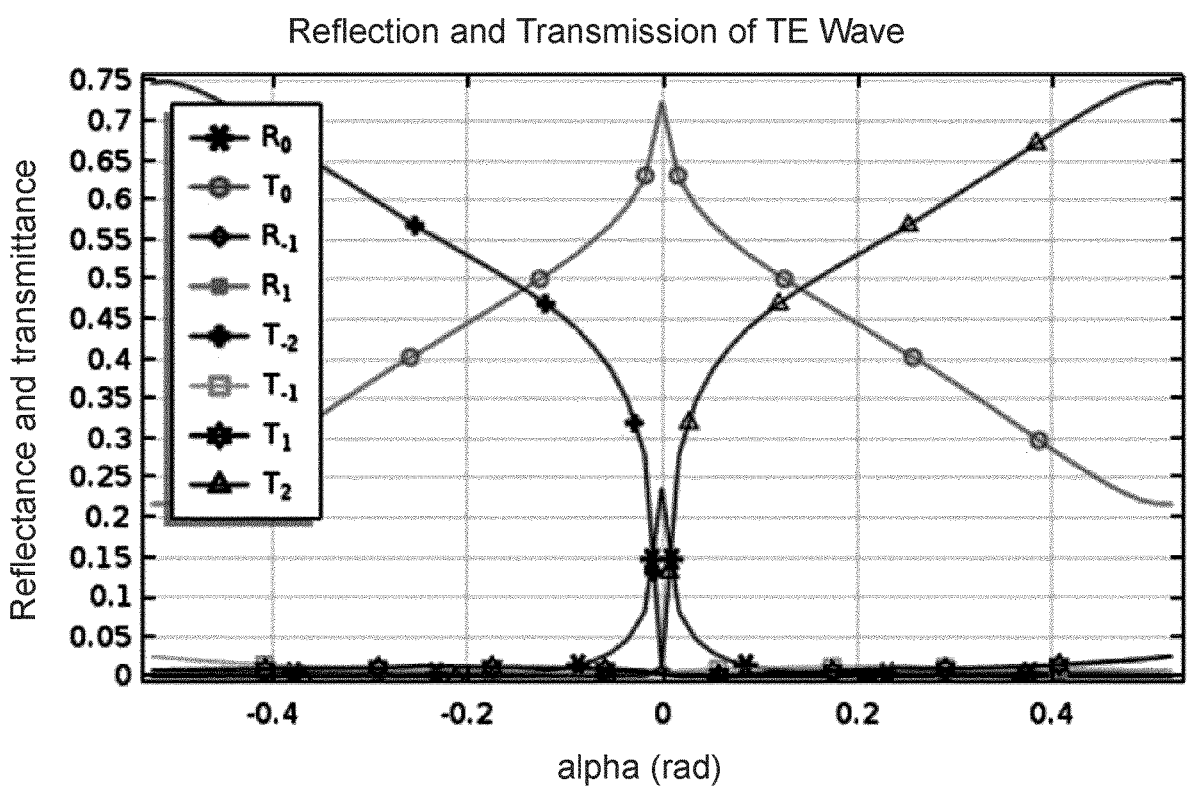
FIG. 17 illustrates performances of the structure illustrated in FIG. 16.

FIG. 17 illustrates the performance of the twin structure of FIG. 16. On FIG. 17, we can see that $\rho_{max}=75\%$, $\Gamma=64\%$ from 3 to 30 and −30 to −3 degrees.

The performances are very good since a maximum diffraction efficiency of 75% and a diffraction uniformity of 64% are achieved. These values are excellent and represent real improvements when compared to structures from FIGS. 6 and 12.

Figure 18:
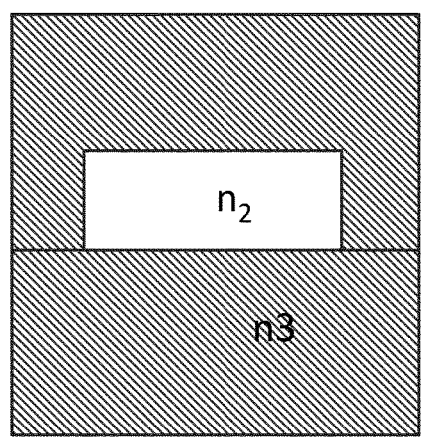
FIG. 18 illustrates an exemplary regular structure of a diffraction grating according.
Figure 19:
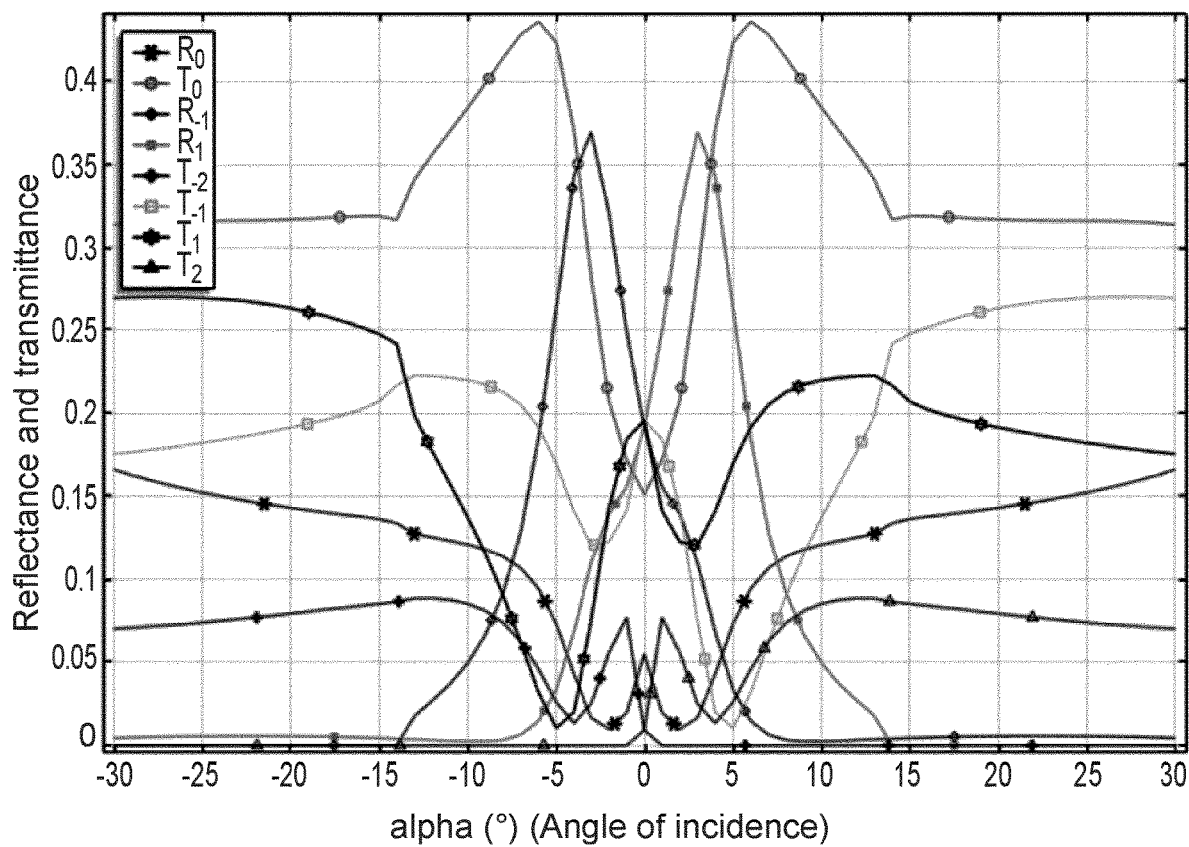
FIG. 19 illustrates diffraction efficiencies for the structure illustrated in FIG. 18.

For comparison with the above results, FIG. 18 shows a single material of refractive index $n_2$ deposited on a glass substrate with refractive index $n_3$. FIG. 19 shows the very poor diffraction efficiency of second orders in this case.

FIG. 20(a) illustrates the cross-section view of single-material metaelements for the embodiment illustrated in FIG. 16. The structure in FIG. 20(a) has two blocks ME21 and ME22 of a single material having refractive index $n_2$ which are separated by a distance $W_1$ filled with the host medium having refractive index $n_1$. FIG. 20(b)) illustrates the cross-section view of a single material metaelement composed of a single block (B1). In both FIGS. 20(a) and 20(b), the parameters are the following: $n_1=1.0$, $n_2=2.105$, $W_1=260$ nm, $W_2=130$ nm, $H=200$ nm, $\theta_i=0°$.

FIGS. 21(a) and (b) illustrate the same as FIGS. 20(a) and (b) but with an incident angle of the electromagnetic wave $\theta_i=30°$.

Figure 20:
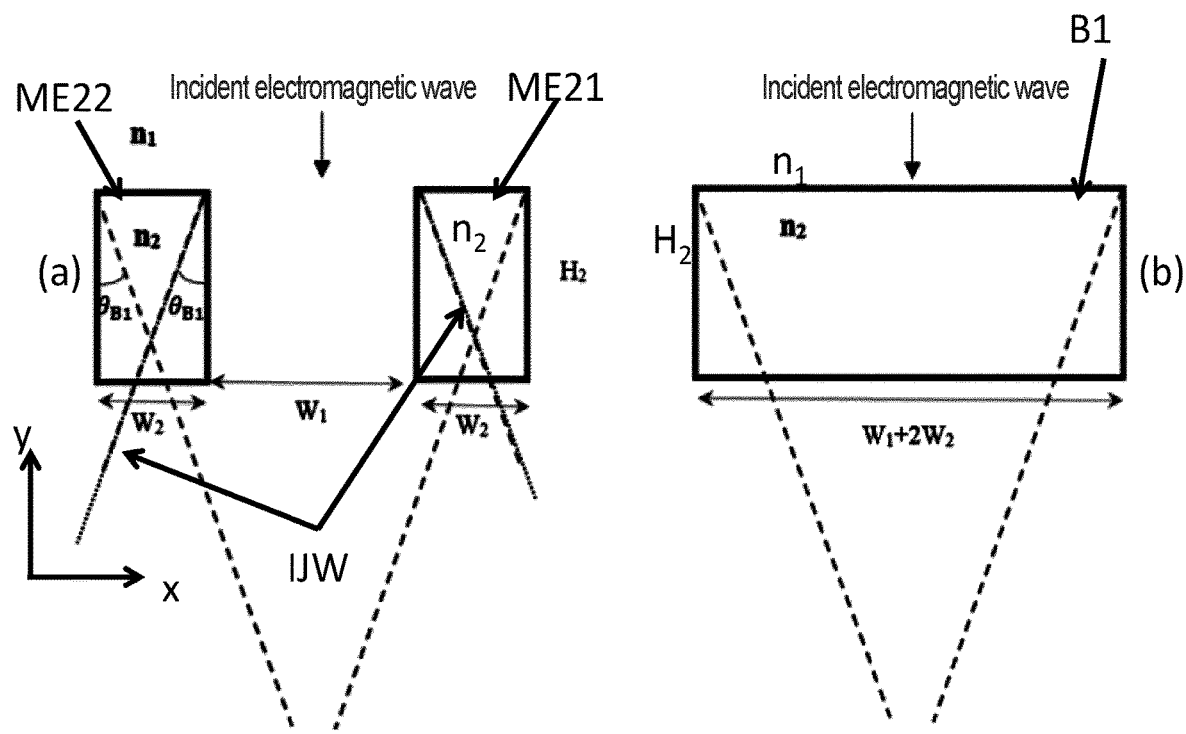
FIG. 20 illustrates cross-section views of single-material metaelements illustrated in FIG. 16 (left part) and in FIG. 18 (right part) with the parameters: $n_1=1.0$, $n_2=2.105$, $W_1=260$ nm, $W_{2=130}$ nm, $H=200$ nm, $\theta_i=0°$.
Figure 21:
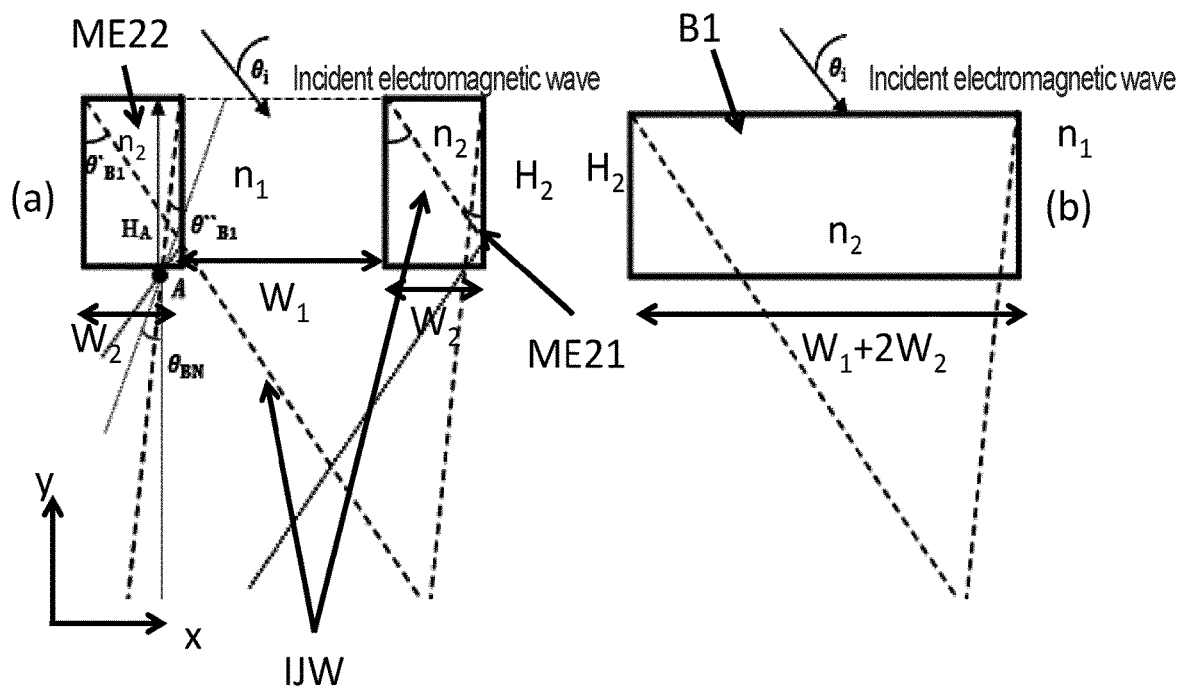
FIG. 21 illustrates cross-section views of single-material metaelements illustrated in FIG. 16 (left part) and in FIG. 18 (right part) with the parameters: $n_1=1.0$, $n_2=2.105$, $W_1=260$ nm, $W_{2=130}$ nm, $H=200$ nm, $\theta_i=30°$.
Figure 22A:
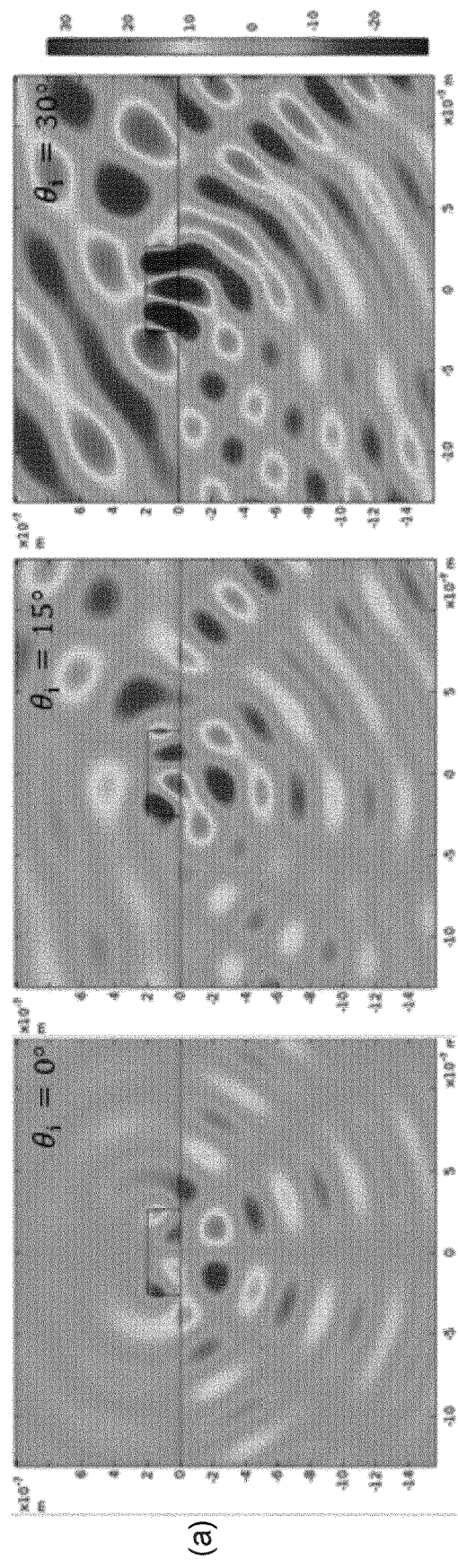
FIG. 22A illustrates (a) Hy component distribution and (b) power density distribution in the xy-plane for the single NJ element illustrated in FIG. 18 with the parameters: $n_1=1.0$, $n_2=2.105$, $n_{3=1.52}$, $W_1=260$ nm, $W_2=130$ nm, $H_2=200$ nm, $\lambda=625$ nm.
Figure 22A:
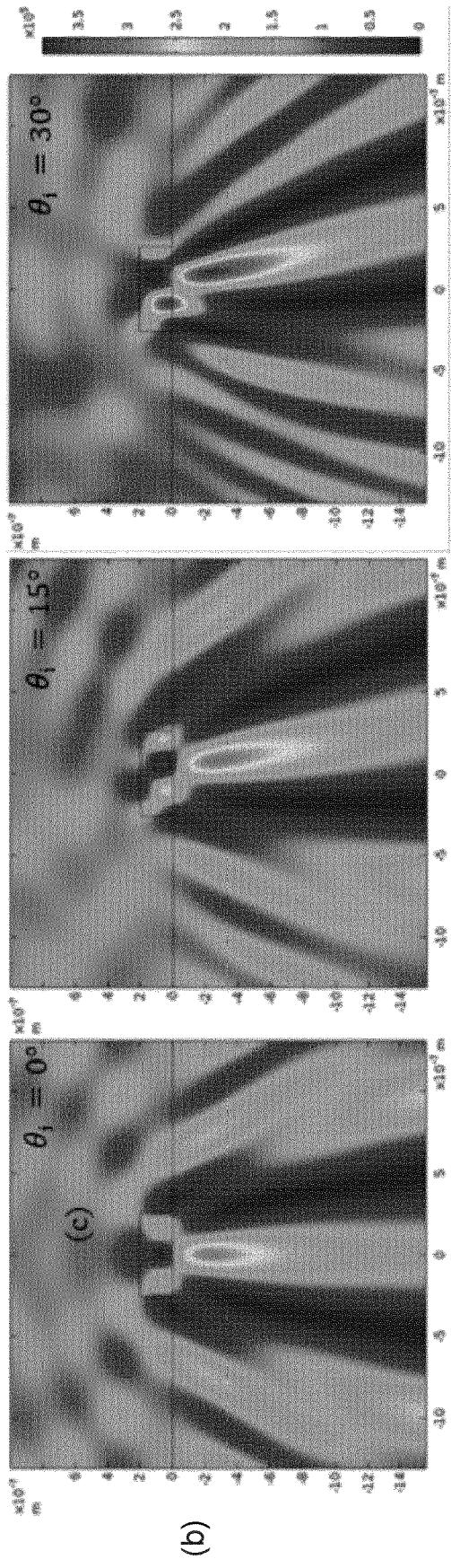
Figure 22B:
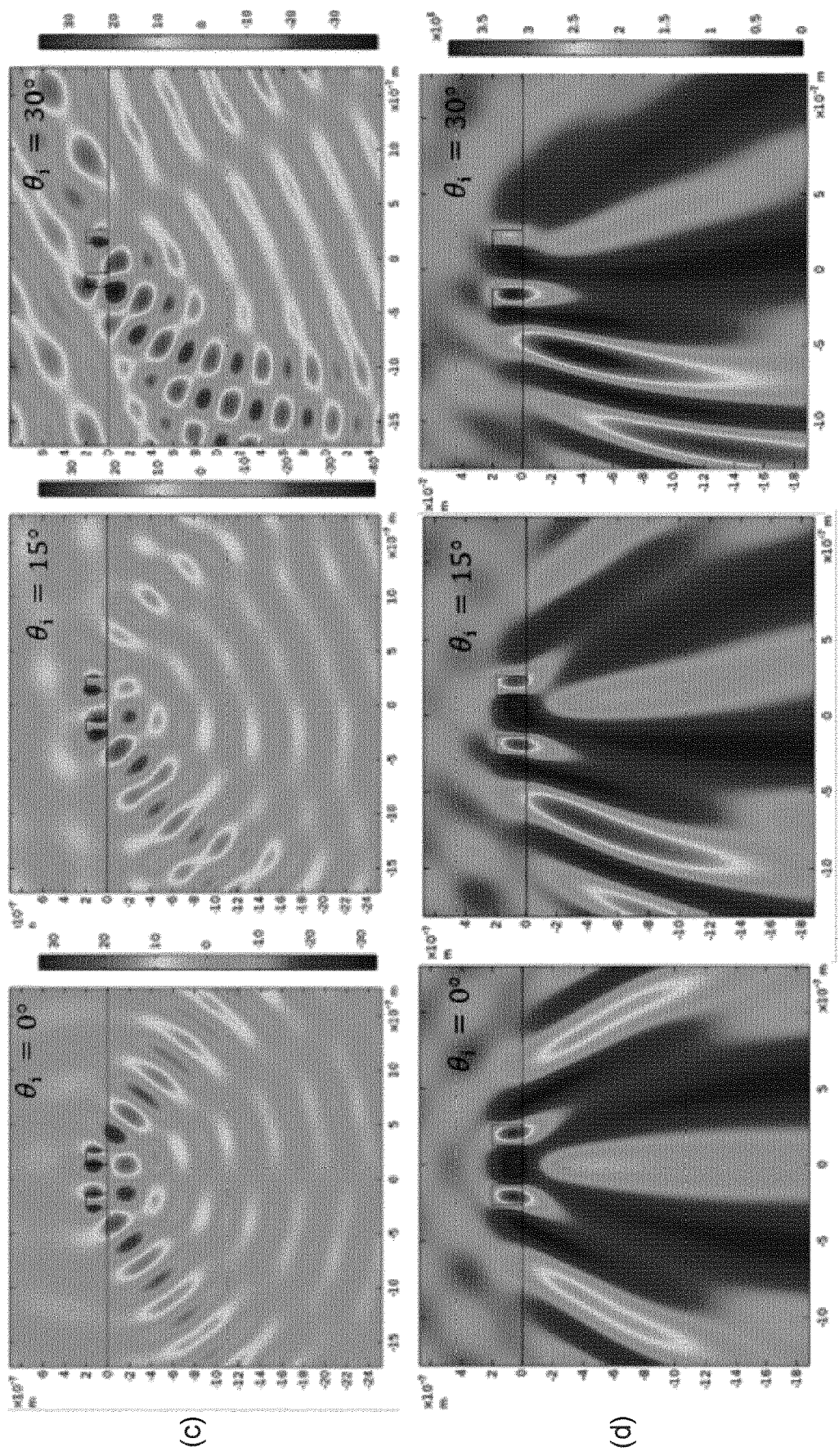
FIG. 22B illustrates (c) Hy component distribution and (d) power density distribution in the xy-plane for the twin structure metaelement illustrated in FIG. 16 with the parameters: $n_1=1.0$, $n_{2=2.105}$, $n_{3=1.52}$, $W_1=260$ nm, $W_2=130$ nm, $H_2=200$ nm, $\lambda=625$ nm.

FIG. 22A illustrates the Hy component field distribution (a) and power density distribution (b) in the xy-plane for the single NJ element B1 of the right part of FIG. 20 for three different incident angles and FIG. 22B illustrates the Hy component field distribution (c) and power density distribution (d) in the xy-plane for the twin structure metaelements ME21 and ME22 of the left part of FIG. 20. In both cases, the parameters are the following: $n_1=1.0$, $n_2=2.105$, $n_{3=1.52}$, $W_1=260$ nm, $W_2=130$ nm, $H_2=200$ nm, $\lambda=625$ nm.

The total internal reflection phenomenon helps to modify the response of the system in case of single material elements. In FIGS. 20(a), and 21(a), $W_1$ is the distance between the elements and $n_1$ is the refractive index of host medium and $n_1 < n_2 < n_3$.

In the single NJ element system illustrated in FIGS. 20(b) and 21(b), there are two NJs associated with 2 external edges (left and right edges) of the block B1 (see FIG. 20(b), dashed lines correspond to NJ beams with the deviation angle $\theta_{B1}$).

The existence of two additional edges in the double block system or twin structure illustrated in FIGS. 20(a) for $\theta_i=0$ degrees leads to radiation of four NJs (two NJs in each block for left and right edges) with deviation angles $\theta_{B1}$ (see dashed lines in FIG. 20(a), dashed lines indicated by UW correspond to the NJ beams generated by the internal edges in the twin system (FIG. 20(a)). By changing the distance between the internal edges, the condition of constructive and destructive interference for the corresponding waves diffracted by the right or left edges of the blocks and propagating in the same direction is satisfied. With the parameters of the system mentioned above, diffracted waves propagating in the same direction interfere destructively or constructively. So, the distributions at corresponding angles can be intensified or suppressed (see FIG. 22B(c)).

For a case of normal incidence, the radiation angles of all NJs are the same $\theta_{B1}$. Comparing the power distribution for the single material system and the double material system, it appears that in case of twin structure, the existence of two additional internal edges leads to the decrease of the intensity of the central NJ (this central NJ resulting from the intersection of NJs generated by the external edges of the block(s) is directed along the axis of the symmetry of metaelements) and to the beginnings of 2 additional NJs with higher intensity resulting from the intersection of NJs generated by the external and internal edges of the blocks.

For the inclined incidence, a first pair of NJs with radiation angles $\theta'_{B1}$ and a second pair with radiation angles $\theta''_{B1}$ are obtained. Equations for $\theta'_{B1}$ and $\theta''_{B1}$ have already been discussed earlier in the dual material solution with insert (FIG. 10) and are not repeated here.

The combination of constructive and destructive phenomena for each pair with the total internal reflection of the waves for some angles of incidence leads again to the redistribution of the intensity between the corresponding diffraction orders for the periodic array of the metaelements. As a result, $\pm 1^{st}$ diffraction orders are suppressed and the intensities of $\pm 2^{nd}$ diffraction orders are increased as illustrated by the comparison of FIGS. 17 and 19.

It is possible to further intensify of $\pm 2^{nd}$ diffraction orders for the twin elements topology by considering some parameters restrictions. To get maximal intensity of the $2^{nd}$ diffraction order, in case of negative angles of incidence, the following parameters are considered:

1. choose $$H_2 \geq \frac{W_2}{\tan\theta'_{B1}}$$

to change the direction of NJs generated by the left vertical edge of the blocks;

2. choose $$H_2 < \frac{W_2}{\tan\theta''_{B1}}$$

to avoid the reflection of the NJs generated by the right vertical edges of the blocks;

3. The width of corresponding blocks and distance between the blocks depend on the period of diffraction grating:

$$W_1 < \frac{d}{3}$$

and $$W_1 + W_2 \neq \frac{d}{2}.$$

In an ideal case to provide the constructive interference between the NJs generated by the left or right edges of the blocks, it is preferred to have $$W_1 + W_2 \approx \frac{\lambda}{\sin\theta'_{B1} \times n_3 - n_1 \times \sin\theta_i} \text{ or}$$

$$W_1 + W_2 \approx \frac{\lambda}{\sin\theta''_{B1} \times n_3 - n_1 \times \sin\theta_i}.$$

But optimizing these parameters, it has to be taken into account that good diffraction uniformity of the system in the wide range of the angles of incidence is desirable. Thus, it is impossible to provide the constructive interference for all angles of incidence within the field of view.

4. It is necessary to note that inside each block the NJs generated by the opposite edges intersect at a point A (see FIG. 21). The distance between the top of each block and this point of intersection can be determined as $$H_A \approx \frac{W_2}{\tan\theta'_{B1} - \tan\theta''_{B1}}.$$

To get the maximal NJ input into the corresponding diffraction order the angle of focal point A deviation from the vertical axis $$\theta_{BN}\left(\tan\theta_{BN} \approx \frac{\tan\theta'_{B1} + \tan\theta''_{B1}}{2}\right)$$

should approximate to the angle of corresponding diffraction order distribution. Also, the focal point A shall be chosen close to the boundary between the blocks and substrate ($H_2 \rightarrow H_A$).

In case of positive angles of incidence, taking the twin elements with the above parameters provides an intensified $\pm 2^{nd}$ diffraction order.

Figure 23:
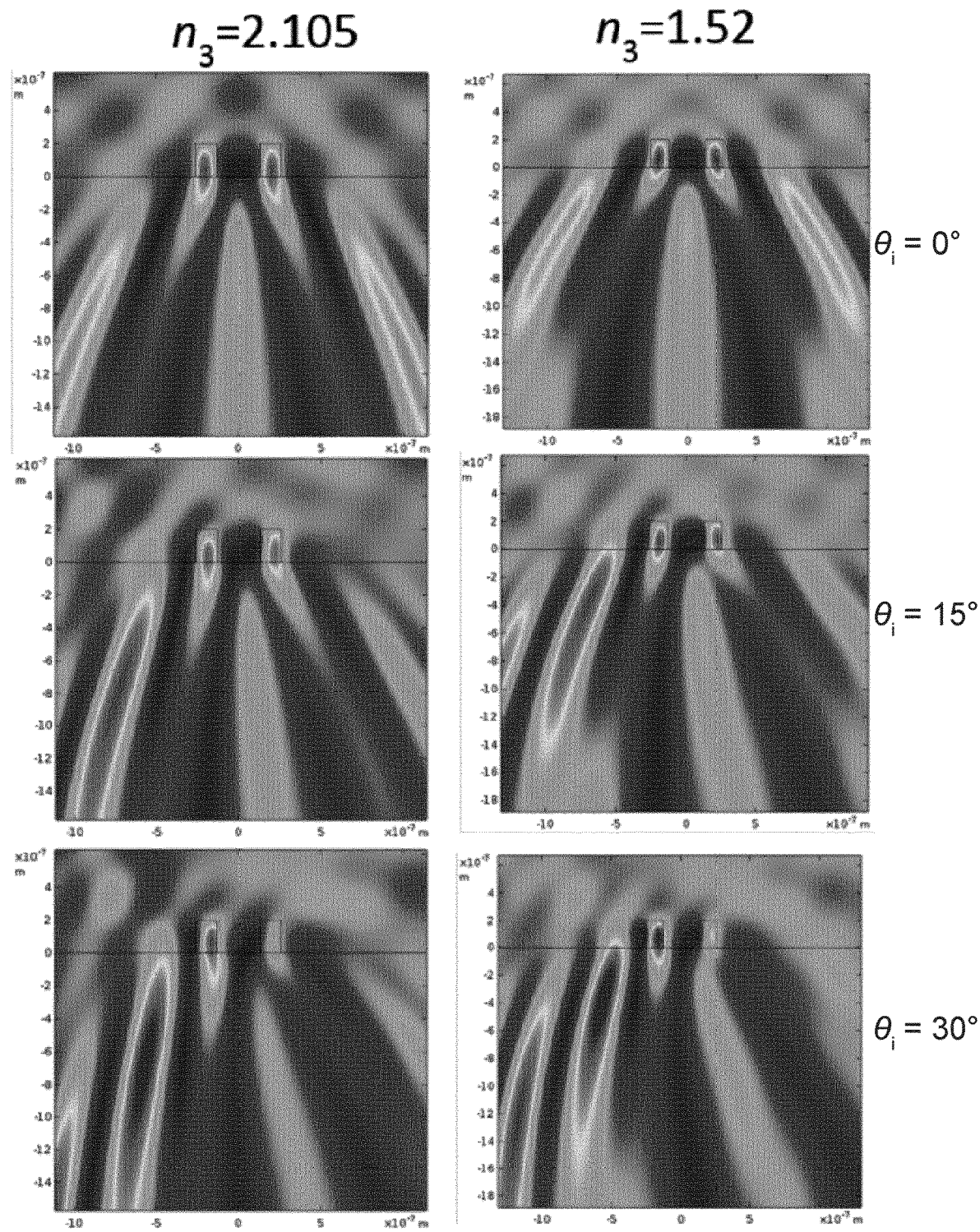
FIG. 23 illustrates power density distribution in the xy-plane for the twin structure metaelement illustrated in FIG. 16 with the parameters: $n_1=1.0$, $n_2=2.105$, $W_1=260$ nm, $W_{2=130}$ nm, $H_2=200$ nm, $\lambda=625$ nm; $n_3$ (in left column)= 2.105, $n_3$ (in right column)=1.52.

Considering a diffraction grating presenting a periodic array of the twin metaelements placed on the substrate with lower refractive index as illustrated in FIG. 16, refraction of the wave diffracted by the edges of the metaelements at the boundary between the substrate and elements affects the angle NJ deviation. FIG. 23 illustrates the power density distribution in the xy-plane for the twin structure metaelement with the parameters: $n_1=1.0$, $n_2=2.105$, $W_1=260$ nm, $W_2=130$ nm, $H_2=200$ nm, $\lambda=625$ nm; and $n_{3=2.105}$ for the left column and $n_{3=1.52}$ for the right column.

5.2.4 U-Shaped Structure

Figure 24:
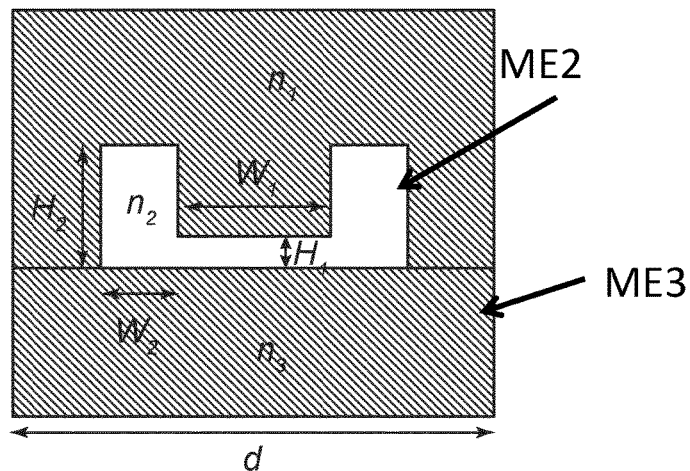
FIG. 24 illustrates another exemplary geometry for a base pattern of a diffraction grating according to an embodiment of the present disclosure.

FIG. 24 illustrates another embodiment for a base pattern of a diffraction grating of an optical device according to the present principle. According to this embodiment, the base pattern comprises a block ME2 of single material having a refractive index $n_2$ and having a U shape, placed on top of a substrate ME3 having a refractive index $n_3$. Values presented on FIG. 24 are only examples. More precisely, the U-shape form is commonly known as a form forming the letter U. On FIG. 24, it can be seen that the block ME2 has two lobes or blocks of single material having a refractive index $n_2$ of height $H_2$ and width $W_2$ separated by a b and of a same single material having a refractive index $n_2$ of height $H_1$ and width $W_1$.

Geometry wise, a high index $n_2$ single material is deposited and e-beamed on a glass substrate ME3. There is no glass etching required, and no multiple e-beam lithography, and these two facts are advantageous for the micro-fabrication.

The structures are also very shallow with a height of 200 nm, to compare with the embodiment disclosed with FIG. 6 which has a height of 700 nm.

Figure 25:
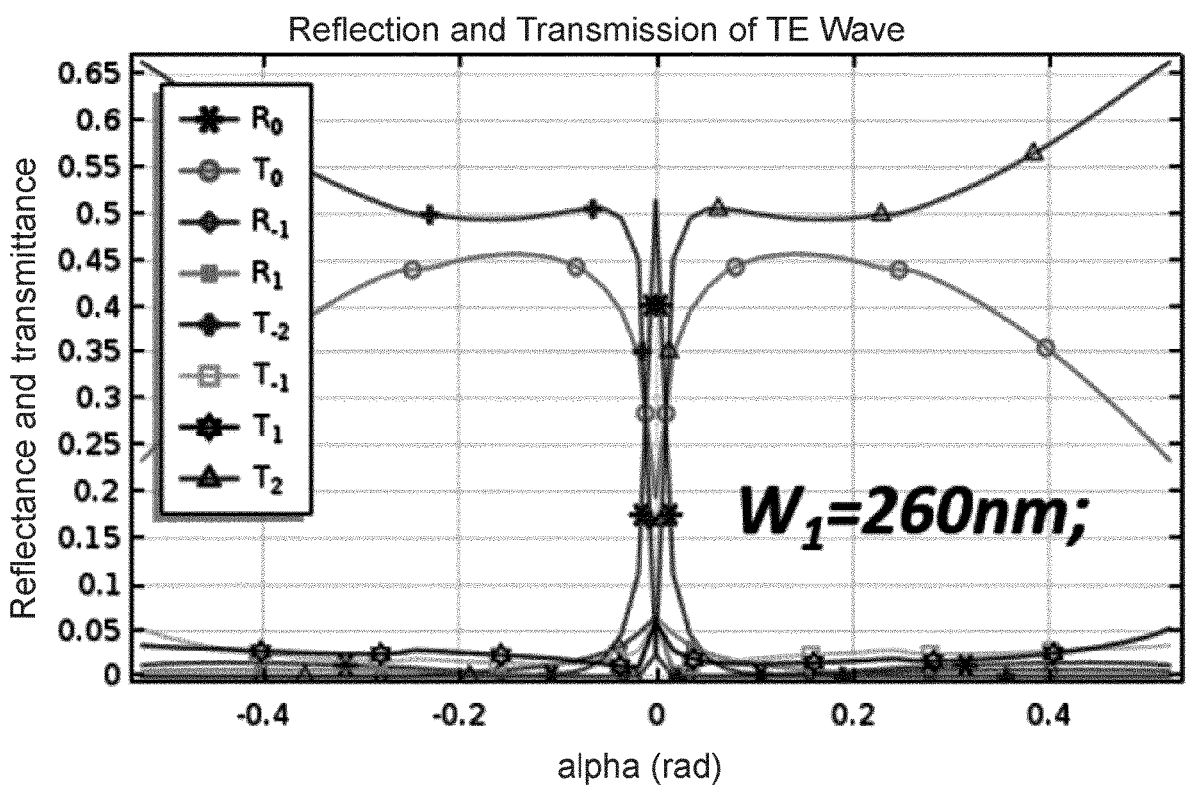
FIG. 25 illustrates the performance of the U shaped structure illustrated in FIG. 24.

As illustrated by FIG. 25, the performances are very good since a maximum diffraction efficiency of 65% is achieved, which is somewhat lower than the efficiency achieved with the twin structure. However, the diffraction uniformity has a value of ⌈=87%, which is excellent. These performances are excellent and represent real improvements when compared to structures from FIGS. 6 and 12.

Figure 26:
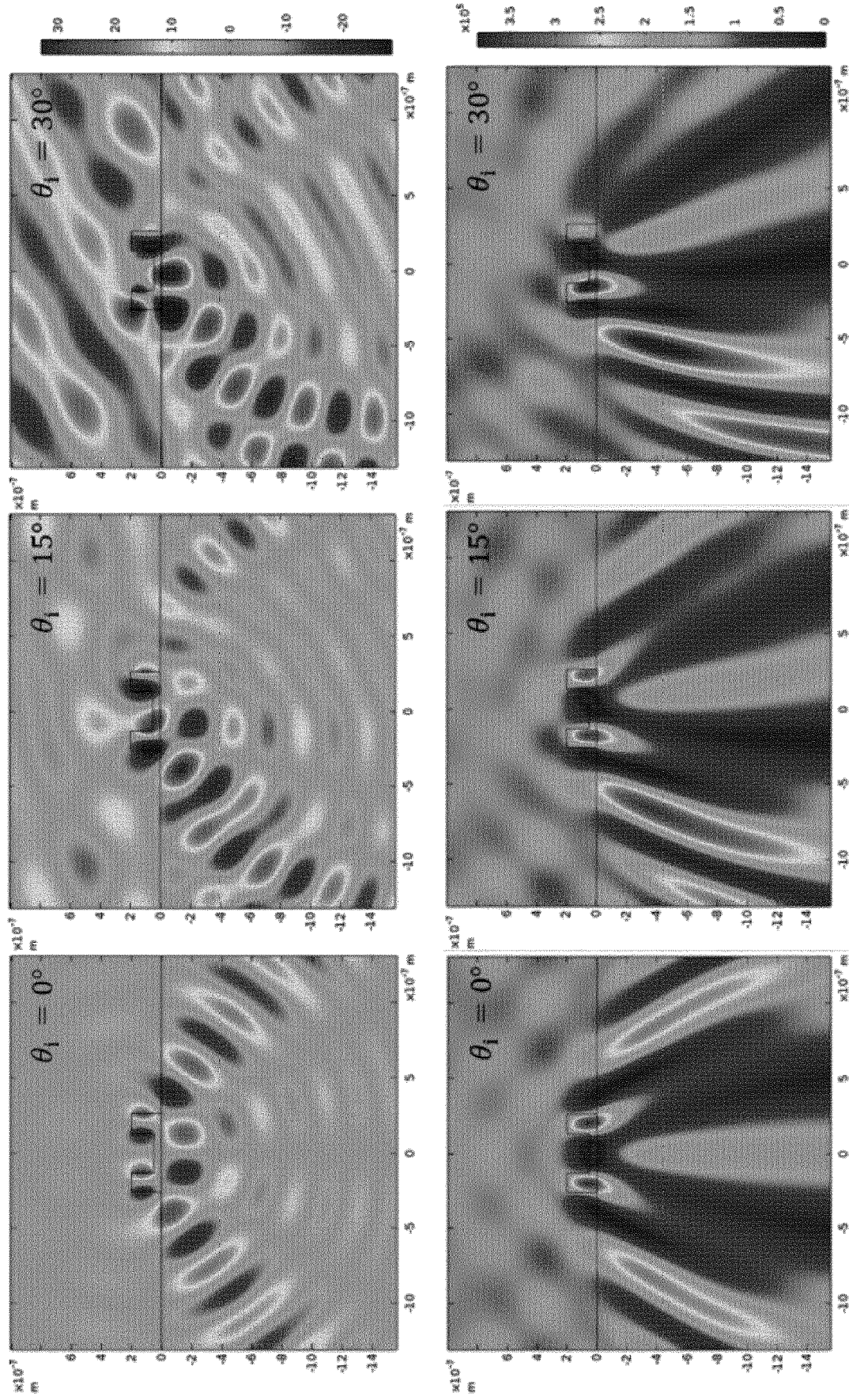
FIG. 26 illustrates (a) Hy component distribution and (b) power density distribution in the xy-plane for the U-shaped metaelement illustrated in FIG. 24 with the parameters: $n_1=1.0$, $n_{2=2.105}$, $n_{3=1.52}$, $W_1=260$ nm, $W_2=130$ nm, $H_2=200$ nm, $H_{1=50}$ nm, $\lambda=625$ nm.

FIG. 26 illustrates the Hy component distribution (top part) and power density distribution (bottom part) in the xy-plane for the U-shaped metaelement illustrated in FIG. 24, with the parameters: $n_{1=1.0}$, $n_2=2.105$, $n_{3=1.52}$, $W_1=260$ nm, $W_2=130$ nm, $H_2=200$ nm, $H_{1=50}$ nm, $\lambda=625$ nm.

The U-shape metaelement with higher refractive index $n_2$ helps to decrease the intensity of central NJ in a case of normal incidence and to increase the intensity of the side lobes. For the U-shaped topology, the intensity of $\pm 2^{nd}$ diffraction orders for the small angles of incidence can be increased and the diffraction uniformity can be improved as illustrated by the performances shown on FIG. 25.

The height of the central block ($H_1$) can be obtained by taking into account that for some particular angles of incidence, the NJs generated by the left edge of the left block (in the case of negative angles of incidence) or by the right edge of the right block (in the case of positive angles of incidence) are not reflected by the opposite edges and do not change the direction of propagation. For the rest of the incidence angles, a possible choice is $$H_2 - H_1 \geq \frac{W_2}{\tan\theta'_{B1}}$$

Equations for $\theta'_{B1}$ have already been discussed earlier in the dual material solution with insert (FIG.) and are not repeated here.

The width $W_1$ of the central b and separating the two lobes of the U-shape should also satisfy the relations defined for $W_1$ and $W_2$ in the twin structure.

5.2.5 Pitch Tolerancing

Figure 27:
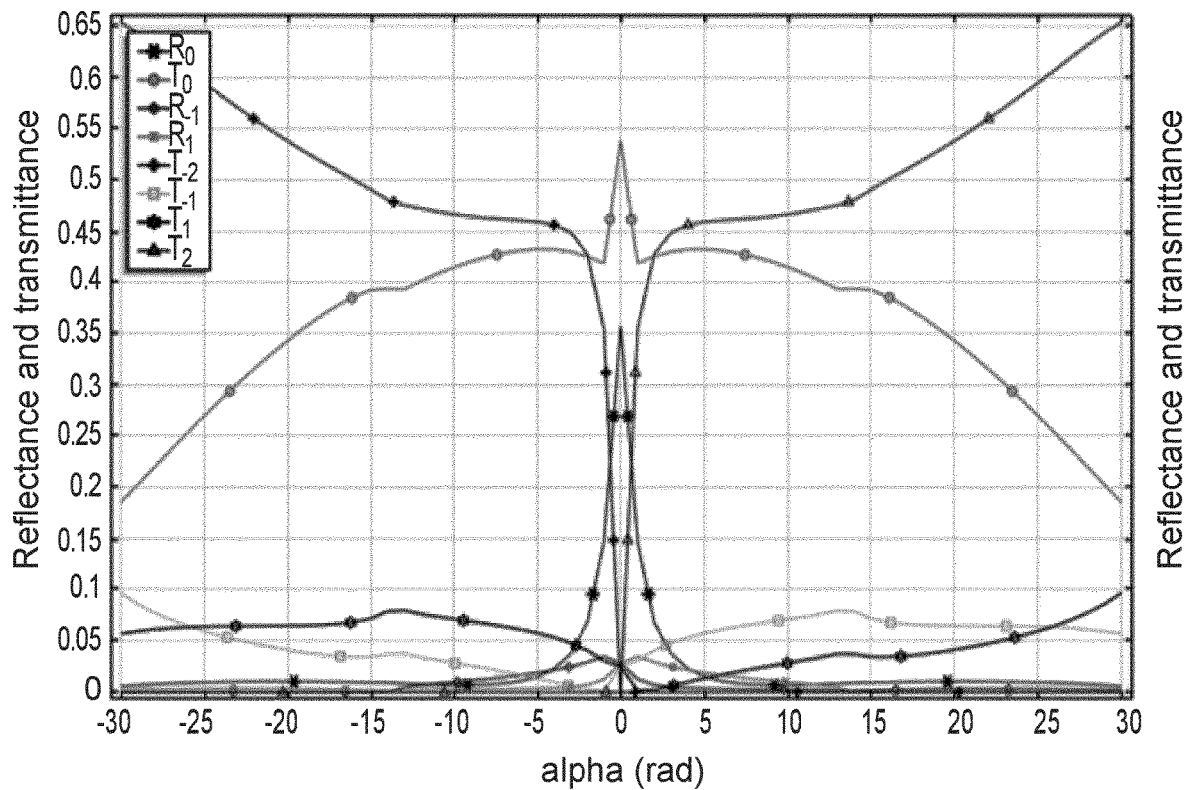
FIG. 27 illustrates performances for different pitch sizes for d=823±5 nm for the U shaped structure illustrated in FIG. 24: top part shows the performances for d=818 nm and bottom part shows the performances for d=832 nm.
Figure 27:
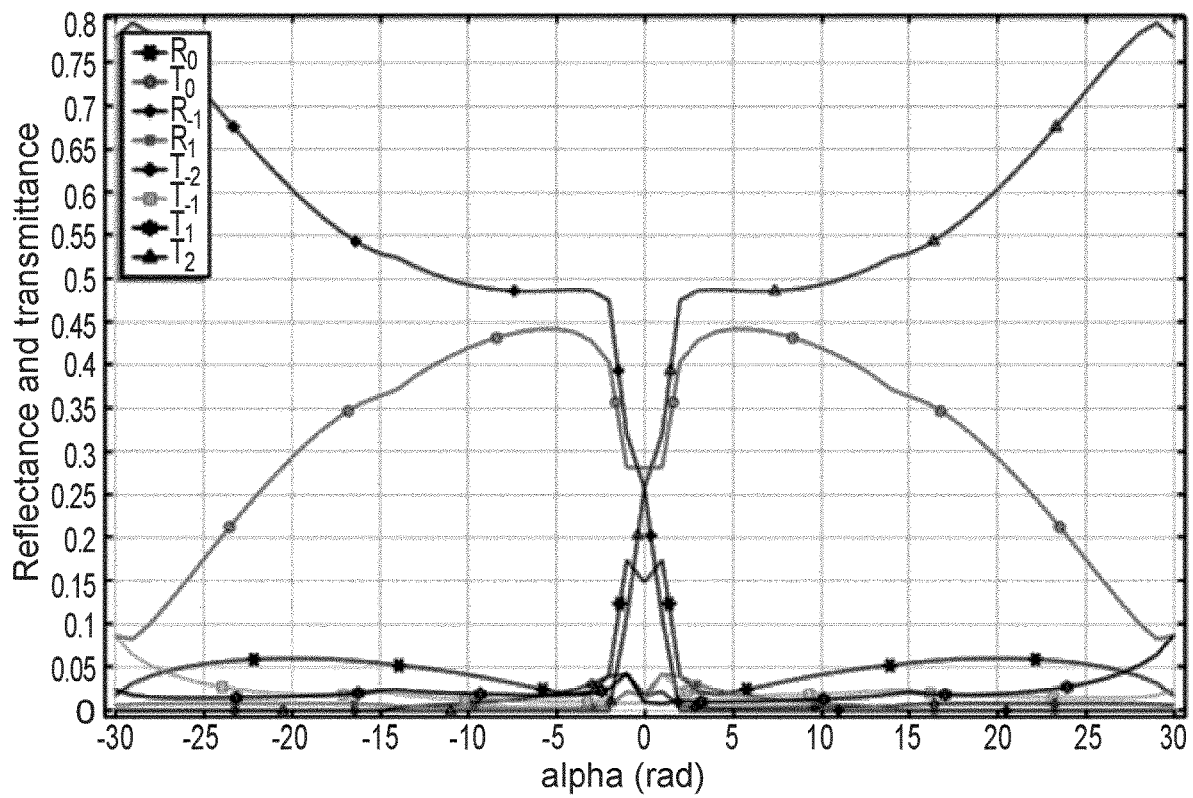

The values provided for the U-shaped structure should be chosen so as to be tolerance robust, and in order to check the precision required for the fabrication, performances for different pitch sizes are disclosed with FIG. 27. The original pitch is d=823 nm.

FIG. 27 illustrates the tolerancing in the pitch size for d=818 nm and d=832 nm. The top part of FIG. 27 represents the performances for d=818 nm. It has $\rho_{max}$=65%, ⌈=81.8%. The bottom part of FIG. 27 represents the performances for a pitch of d=832 nm. It is of $\rho_{max}$=78.5%, ⌈=76.2%. FIG. 27, shows that diffraction orders ±2 still have a high diffraction efficiency and uniformity for d=823±5 nm.

5.4 Nanojet Enhanced Single Mode of Higher Order Diffraction

The principle discussed above (having over-wavelength grating pitch and second order diffraction) can also be extended to an in-coupler that just deviates the image into a single side of the waveguide instead of deviating positive angles into one direction and negative angles into another one.

Figure 28:
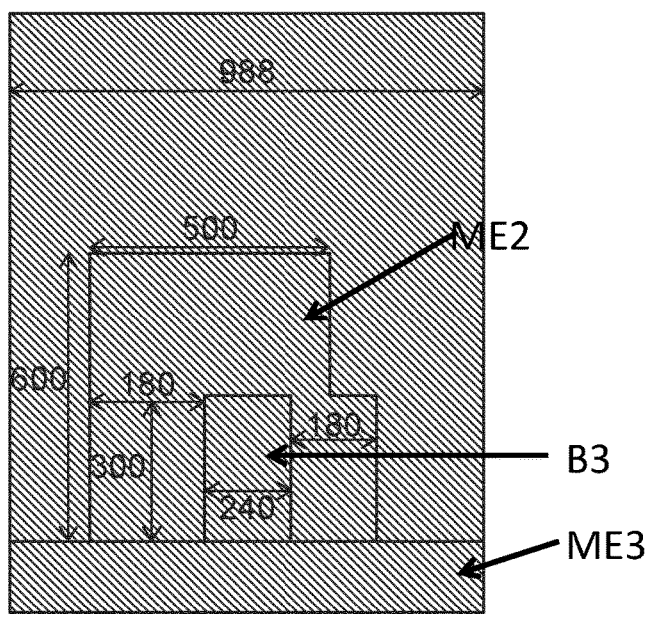
FIG. 28 illustrates an exemplary geometry and pitch size for another embodiment of the base pattern of the diffraction grating.

For that purpose, the geometry needs to break the symmetry in order to enhance one diffraction order. FIG. 28 illustrates a geometry and pitch size for an alternative embodiment of the base pattern of the diffraction grating.

From FIG. 28, it appears that the grating's pitch is even bigger than the grating's pitch disclosed above (988 nm in that case), it is almost a micro-meter sized spacing, its aspect ratio is close to 1.

According to this embodiment, the base pattern is similar to the geometry illustrated in FIG. 6, but with a height on the right side that is lower than the height on the left side, to break the symmetry.

Figure 29:
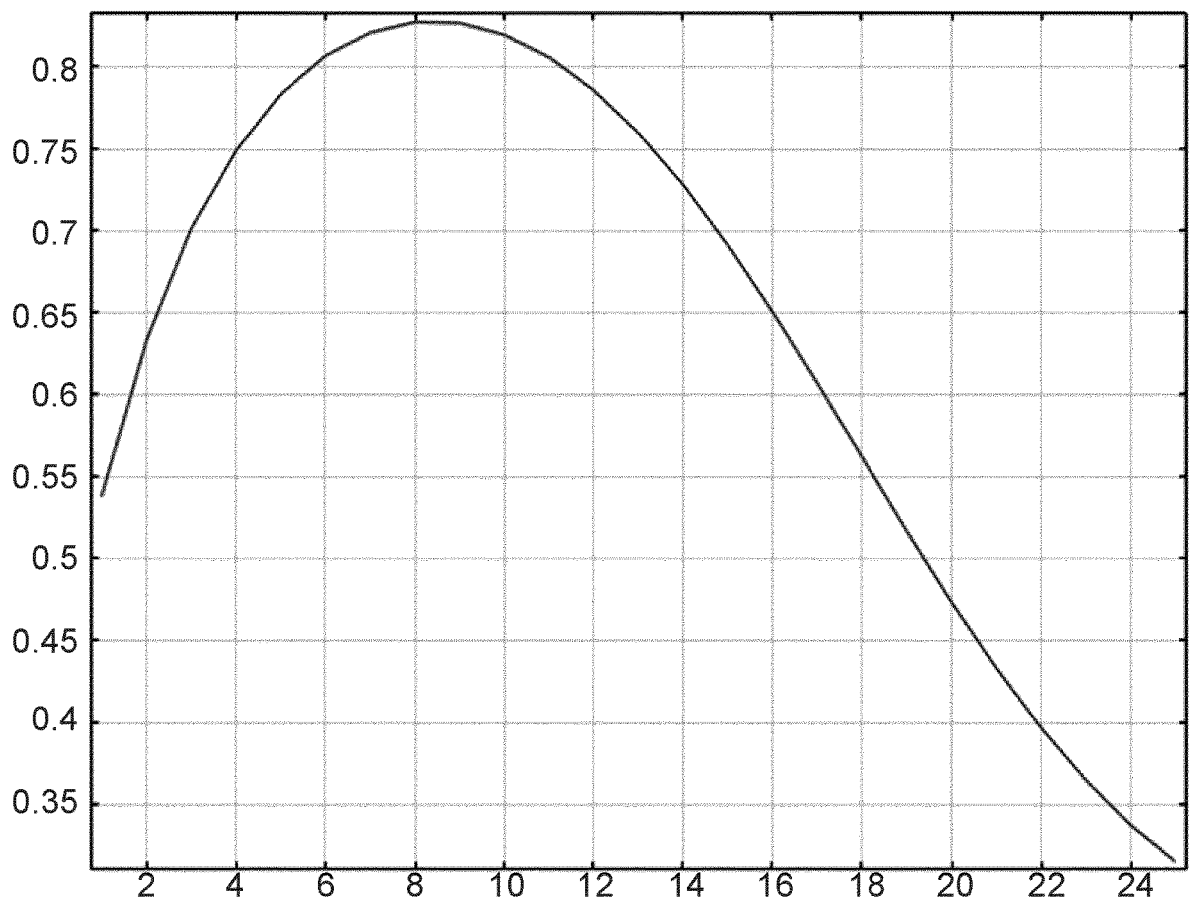
FIG. 29 illustrates the performance of the geometry illustrated in FIG. 28 showing the +2 diffraction order efficiency as a function of the angle of incidence.

FIG. 29 illustrates the performance of this geometry. The horizontal axis spans ±12 degrees. The curve represents the +2 diffraction order efficiency as a function of the angle of incidence. This structure achieves a maximum efficiency of 84 percent and a uniformity of 54 percent for input angles spanning ±12 degrees.

5.5 Diffraction Grating with Structures Having Modified Base Angles

Figure 33:
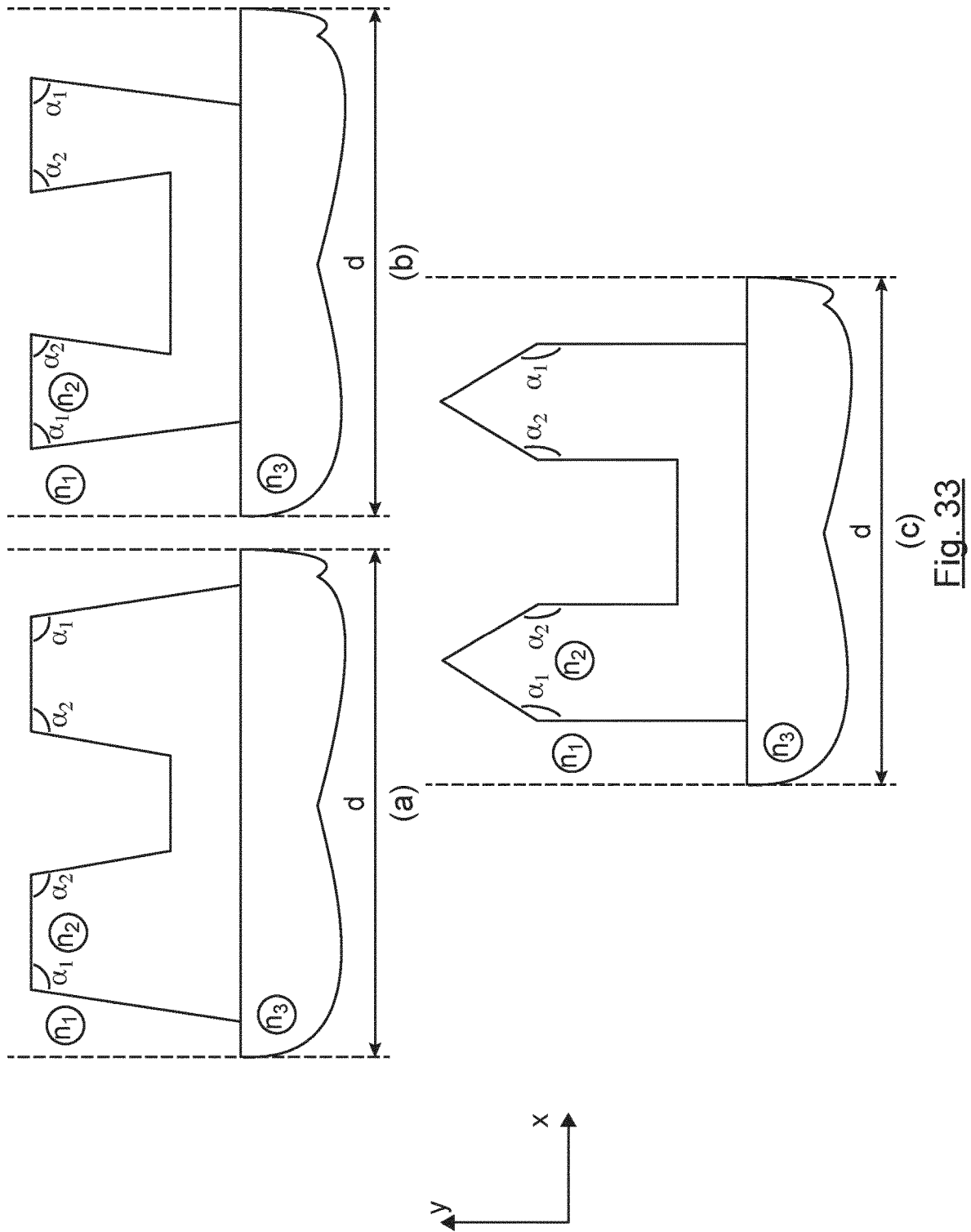
FIG. 33 illustrates cross-section views of single-material metaelements ($n_2=n_3$) with nonvertical edges (FIGS. 33a, 33b) and top surfaces nonparallel to xz-plane (FIG. 33c)

FIG. 33 illustrates cross-section views of single-material metaelements ($n_2=n_3$) with nonvertical edges (FIGS. 33a, 33b) and top surfaces nonparallel to xz-plane (FIG. 33c).

It is considered here structures with nonvertical edges or/and top surfaces nonparallel to the xz-plane. To demonstrate the effect of the base angles of the constitutive part of the elements of the diffraction grating, the U-shaped elements as illustrated on FIG. 24 are considered. Base angles of the top surfaces of blocks of the U shape are denoted $\alpha_1$ and $\alpha_2$. The base angles correspond respectively to the angles between the top surface of the U-shape and the lateral surfaces of one of block of the U-shape.

A single material metaelement is considered here, with refractive index $n_2$ of the U-shape structure and refractive index $n_3$ of the substrate being equal.

The general topologies of the single-material elements are illustrated in FIG. 33. It can be seen that in these structures, the base angles $\alpha_j \neq 90°$ with j being 1 or 2. The NJ beam radiation angle can be determined using the approximate formula:

$$\theta_{Bj} = 90° - \frac{\sin^{-1}\left(\frac{n_1}{n_2}\right) + \alpha_j}{2},$$

with j being 1 or 2, $n_1$ being the refractive index of the host medium and $n_2$ being the refractive index of the microlens material.

It also should be mentioned that the angle of the NJ distribution is modified due to the internal reflection by the nonvertical edges of the elements.

The structure presented in FIG. 33(c) is optimized in order to deliver the best performances for the blue wavelength at $\lambda$=460 nm. The system is illuminated by a linearly-polarized plane wave H={0; 0; 1}(TM). The grating has a pitch size d=487.4 nm for $n_2$=1.9 and the modified U-shaped structure, using the same references as the ones used in FIG. 24, has $W_1$=60 nm; $H_1$=220 nm; $W_2$=180 nm; $H_2$=360 nm and $n_3$=1.9.

Figure 34:
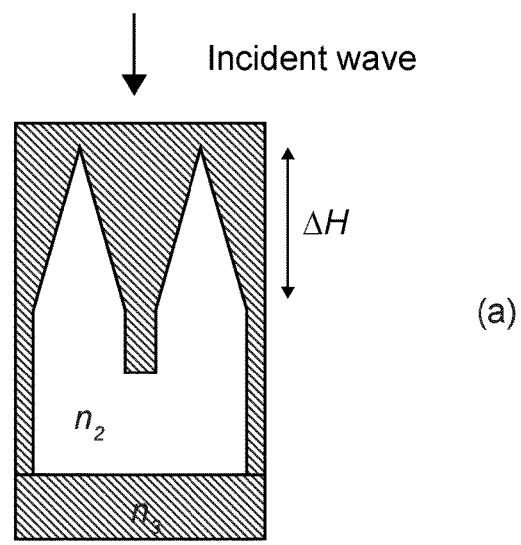
FIG. 34(a) illustrates cross-section views of a diffraction grating unit-cell.
FIG. 34(b) illustrates the diffraction performances of the grating illustrating on FIG. 34(a).

To modify the angle of scattered jet wave, the base angles of the top part of U-shaped element are changed by adding the symmetrical pyramids with height $\Delta H$=360 nm (see FIG. 34(a)). FIG. 34(b) illustrates the diffraction performances of the grating with the above parameters. There is absolutely no cross-talk between orders +2 and -2 per design. Order 0, +1 and -1 do not couple into the waveguide, they transmit through and will not reduce the virtual image contrast.

This modification of the U-shaped topology provides very high diffraction efficiency of the second order for the materials with lower refractive index equal to the refractive index of the substrate ($n_3=n_2$). Unfortunately, the diffraction uniformity of the system is not very high, and the system is very sensitive to the angle of incidence.

5.6 Diffraction Grating for Use in AR/VR Glasses

Figure 32:
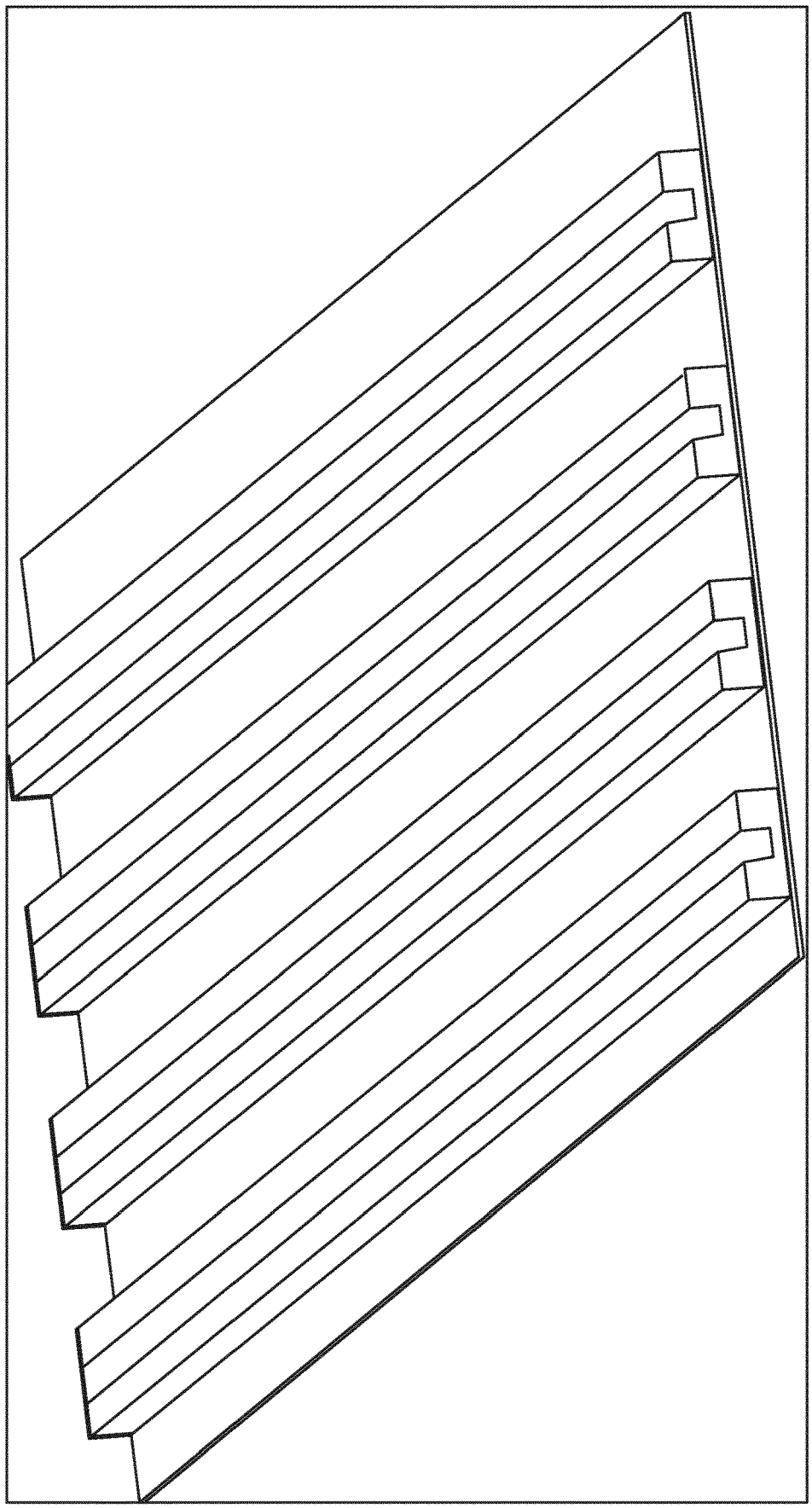
FIG. 32 illustrates an exemplary diffraction grating according to an embodiment of the present disclosure.

FIG. 32 illustrates an exemplary diffraction grating according to an embodiment of the present disclosure. Acceding to the embodiment, the base pattern of the diffraction grating has a U-shape as illustrated with FIG. 24.

According to an embodiment of the present disclosure, the diffraction grating having a base pattern according to any one of the embodiments disclosed herein can be dedicated to diffract only a given wavelength. For instance, when used in an optical waveguide, one diffraction grating per RGB color can be used. This embodiment allows to minimize chromatic aberrations and a grating dedicated to a narrow b and has a much better performance in terms of FoV.

According to another embodiment of the present disclosure, the diffraction grating is configured to diffract light for a group of wavelengths comprising more than one wavelength. In this case, the NJ structure base pattern of the diffraction grating is configured such that the grating pitch is above the highest wavelength of the group of wavelengths. For example, $$d = \frac{M\Lambda}{n} \text{ with } \Lambda = \frac{\lambda_{max} + \lambda_{min}}{2} \text{ and } M = 2,$$

where n is the index of the substrate.

According to an embodiment of the present disclosure, the diffraction grating having a base pattern according to any one of the embodiments disclosed herein can be used in an optical waveguide, for instance for use in a waveguide in AR/VR glasses.

According to this embodiment, the diffraction grating can be configured for in-coupling light incoming into the optical waveguide or for extracting light out of the optical waveguide depending on where the diffraction grating is formed on the waveguide.

According to another embodiment of the present disclosure, the optical waveguide can comprise two diffraction gratings according to any one of the embodiments disclosed herein: one diffraction grating configured for in-coupling light incoming into said optical waveguide and another diffraction grating configured for extracting light out of said optical waveguide.

Each diffraction grating having a grating pitch above a wavelength of the light that it is configured to in couple or out couple, and both diffraction gratings being configured to diffract said light at a diffraction order having an absolute value equal to or greater than 2.

According to an embodiment of the present disclosure, an eye ware apparatus is disclosed which comprises an optical device acceding to any one of the embodiments disclosed above.

Figure 30:
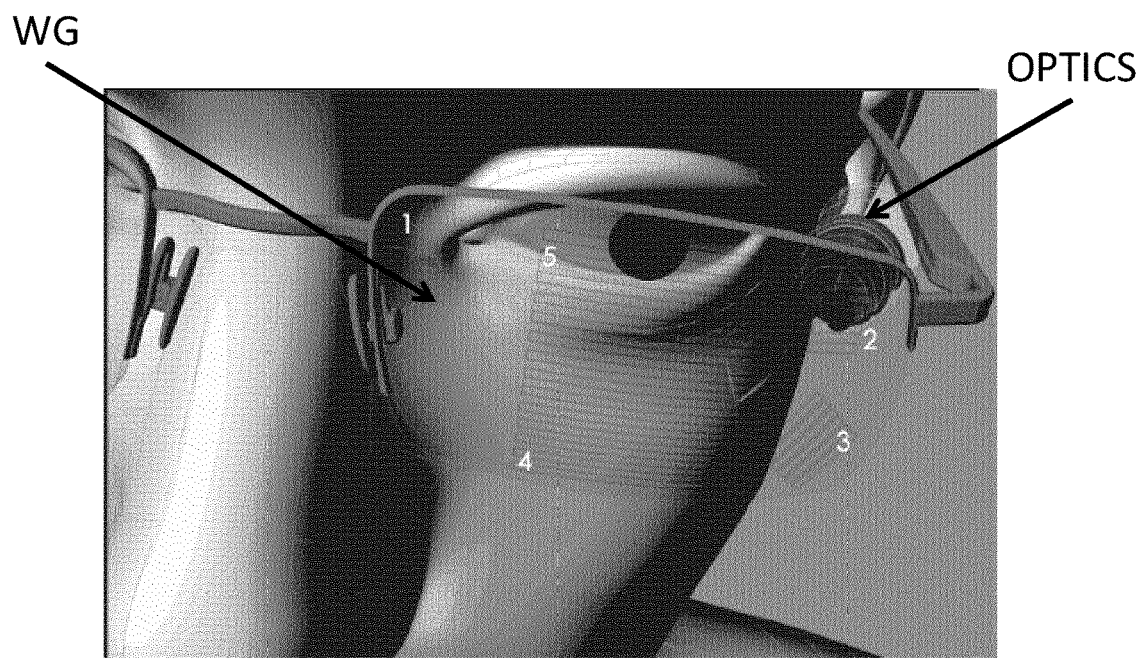
FIG. 30 illustrates a perspective schematic view of an eyewear apparatus according to an embodiment of the present disclosure.
Figure 31:
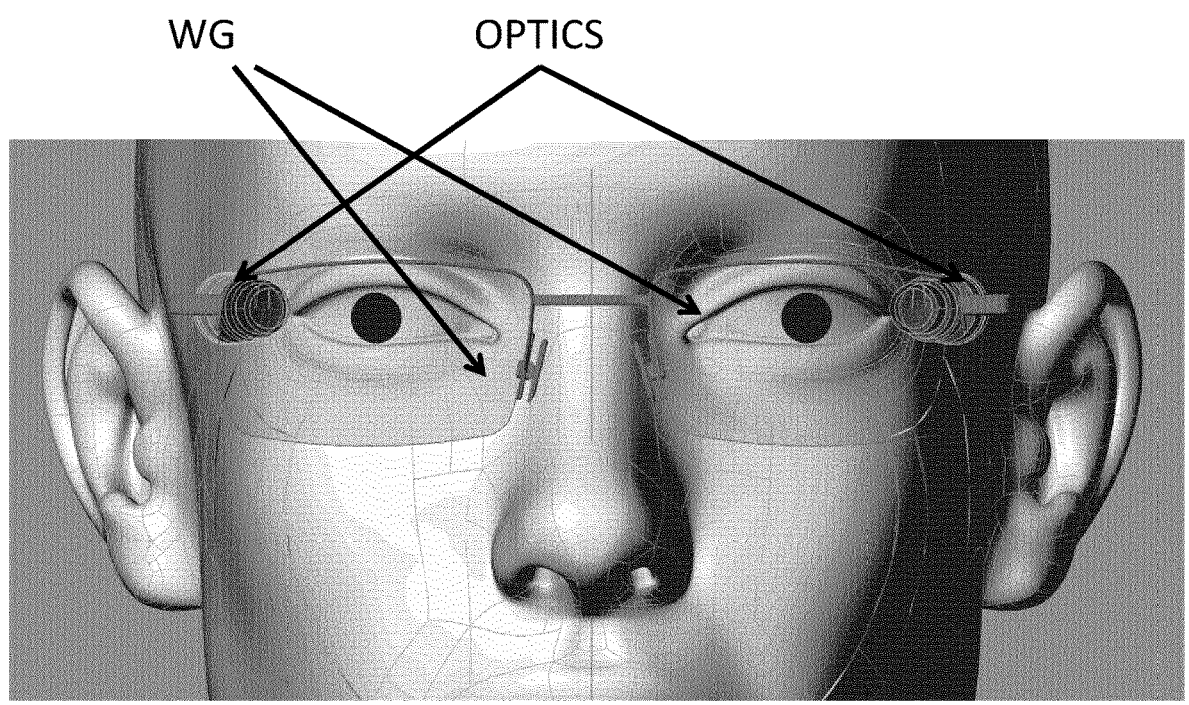
FIG. 31 illustrates a schematic front view of the eyewear apparatus illustrated in FIG. 30.

FIG. 30 illustrates a perspective schematic view of an eyewear apparatus according to an embodiment of the present disclosure, and FIG. 31 illustrates a schematic front view of the eyewear apparatus illustrated in FIG. 30.

According to an embodiment of the present disclosure, such an eye ware apparatus comprises:
  a light display engine (not shown) configured for emitting an image to display, the light engine display could for instance be placed on the branches of the earwear apparatus, a group of optics (OPTICS) configured for coupling incoming light from the light display engine to the optical waveguide (WG).

According to an embodiment, the optical waveguide (WG) is configured for guiding incoming light towards an eye of a user to make the image visible to the user.

According to the embodiment illustrated on FIG. 30, the optical waveguide (WG), also referenced with a "1" comprises an input grating ("2" on FIG. 30) playing the role of an in-coupler. The input grating may be a diffraction grating according to any of the embodiments described above.

The optical waveguide also comprises a vertical eye-pupil expander ("3" on FIG. 30), a horizontal eye-pupil expander ("4" on FIG. 30) and an output grating ("5" on FIG. 30) or out-coupler.

According to an embodiment of the present disclosure, the output grating may be a diffraction grating according to any of the embodiments described above.

As shown on FIG. 31, in order to have a stereoscopic view, an image is emitted from two light engines (not shown) placed respectively on the two branches of the eyewear apparatus. The eyewear apparatus also comprises two waveguides (WG) on each side of the apparatus, as well as two sets of optics (OPTICS) for guiding the light from the respective light engine to the respective waveguide.

The invention claimed is:

1. An eyewear apparatus, comprising:
at least one optical device,
wherein the optical device comprises:
 a diffraction grating configured to diffract an incident light of a given wavelength on the optical device, the diffraction grating having a grating pitch above the given wavelength and being configured to diffract the incident light at a diffraction order having an absolute value equal to or greater than 2,
 wherein the optical device comprises an optical waveguide configured to guide the light diffracted at a diffraction order having an absolute value equal to or greater than 2,
 wherein the diffraction grating comprises a substrate of a first dielectric material with refractive index $n_3$ and at least one second dielectric material with refractive index $n_2$ on top of the substrate,
 wherein the diffraction comprises a base pattern comprising the second dielectric material, the base pattern being configured to form a nanojet beam associated with edges of the base pattern from the light, and
 wherein the base pattern comprises one block of the second dielectric material with refractive index n2 on top of the substrate, the block having a U-shape, the U-shape comprising two lobes with height $H_2$ and width $W_2$ separated by a central block with height $H_1$, where $H_1$ lower is than $H_2$, and $$H_2 - H_1 \geq \frac{W_2}{\tan\theta'_{B1}}$$

with $$\theta'_{B1} \approx \theta_{B1} - \frac{\theta_i}{2},$$

$\theta_i$ being the angle of the incident light with respect to a normal to the top surface of the diffraction grating and $$\theta_{B1} \approx \frac{90° - \sin^{-1}\left(\frac{n_1}{n_2}\right)}{2},$$

$n_1$ being the refractive index of a host medium in which the diffraction grating is placed.

2. The eyewear apparatus according to claim 1, further comprising:
a light display engine configured to emit an image to display, and
optics configured to couple incoming light from the light display engine to the optical waveguide,
the optical waveguide being configured to guide incoming light towards an eye of a user to make the image visible to the user.

3. An optical device comprising:
a diffraction grating configured to diffract an incident light of a given wavelength on the optical device, the diffraction grating having a grating pitch above the given wavelength and being configured to diffract the incident light at a diffraction order having an absolute value equal to or greater than 2,
wherein the optical device comprises an optical waveguide configured to guide the light diffracted at a diffraction order having an absolute value equal to or greater than 2,
wherein the diffraction grating comprises a substrate of a first dielectric material with refractive index $n_3$ and at least one second dielectric material with refractive index $n_2$ on top of the substrate,
wherein the diffraction grating comprises a base pattern comprising the second dielectric material, the base pattern being configured to form a nanojet beam associated with edges of the base pattern from the light, and
wherein the base pattern comprises one block of the second dielectric material with refractive index $n_2$ on top of the substrate, the block having a U-shape, the U-share comprising two lobes with height $H_2$ and width $W_2$ separated by a central block with height $H_1$, where $H_1$ lower is than $H_2$, and $$H_2 - H_1 \geq \frac{W_2}{\tan\theta'_{B1}}$$

with $$\theta'_{B1} \approx \theta_{B1} - \frac{\theta_i}{2}, \theta_i$$

being the angle of the incident light with respect to a normal to the top surface of the diffraction grating and $$\theta_{B1} \approx \frac{90° - \sin^{-1}\left(\frac{n_1}{n_2}\right)}{2},$$

$n_1$ being the refractive index of a host medium in which the diffraction grating is placed.

4. The optical device according to claim 3, wherein the diffraction grating is configured to in-couple light incoming into the optical waveguide or for extracting light out of the optical waveguide.

5. The optical device according to claim 3,
wherein the diffraction grating is configured to in-couple light incoming into the optical waveguide, and
wherein the optical waveguide comprises another diffraction grating configured to extract light out of the optical waveguide, the other diffraction grating having a grating pitch above a wavelength of the light and the other diffraction grating being configured to diffract the light at a diffraction order having an absolute value equal to or greater than 2.

6. The optical device according to claim 3,
wherein $W_1$ being a width of the central block of the block having a U-shape, and $W_2$ being the width of each of the two lobes, and
wherein $W_1$ and $W_2$ depend on a grating pitch d of the diffraction grating with $$W_1 < \frac{d}{3} \text{ and } W_1 + W_2 \neq \frac{d}{2}.$$

7. The optical device according to claim 3,
wherein base angles between a top surface of the U-shape and lateral surface of the U-shape are different from 90°, and
wherein $n_2 = n_3$.

8. The optical device according to claim 3, wherein $n_3 < n_2$ or $n_3 = n_2$.

9. An optical device comprising:
a diffraction grating configured to diffract an incident light of a given wavelength on the optical device, the diffraction grating having a grating pitch above the given wavelength and being configured to diffract the incident light at a diffraction order having an absolute value equal to or greater than 2,
wherein the optical device comprises an optical waveguide configured to guide the light diffracted at a diffraction order having an absolute value equal to or greater than 2,
wherein the diffraction grating comprises a substrate of a first dielectric material with refractive index $n_3$ and at least one second dielectric material with refractive index $n_2$ on top of the substrate,
wherein the diffraction grating comprises a base pattern comprising the second dielectric material, the base pattern being configured to form a nanojet beam associated with edges of the base pattern from the light, and the base pattern comprises two blocks of the second dielectric material with refractive index $n_2$ having identical widths and heights, on top of the substrate, the two blocks being separated by a distance $W_1$, the two blocks having a height $H_2$ with $$H_2 \geq \frac{W_2}{\tan \theta'_{B1}}$$

and $$H_2 < \frac{W_2}{\tan \theta''_{B1}}$$

with $W_2$ being the width of each of the two blocks and $\theta'_{B1}$ and $\theta''_{B1}$ being respective angles of nanojet beam radiations associated with edges of the base pattern from the light, and wherein $$\theta'_{B1} \approx \theta_{B1} - \frac{\theta_i}{2}, \theta''_{B1} \approx \theta_{B1} + \frac{\theta_i}{2}$$

with $\theta_i$ being the angle of the incident light with respect to a normal to the top surface of the diffraction grating and $$\theta_{B1} \approx \frac{90° - \sin^{-1}\left(\frac{n_1}{n_2}\right)}{2},$$

$n_1$ being the refractive index of a host medium in which the diffraction grating is placed,
wherein $W_1$ being the distance separating the two blocks, and $W_2$ being the width of each of the two blocks, and
wherein $W_1$ and $W_2$ depend on a grating pitch d of the diffraction grating with $$W_1 < \frac{d}{3}$$

$$W_1 + W_2 \neq \frac{d}{2}.$$

10. The optical device according to claim 9, wherein the diffraction grating is configured to in-couple light incoming into the optical waveguide or for extracting light out of the optical waveguide.

11. The optical device according to claim 9,
wherein the diffraction grating is configured to in-couple light incoming into the optical waveguide, and
wherein the optical waveguide comprises another diffraction grating configured to extract light out of the optical waveguide, the other diffraction grating having a grating pitch above a wavelength of the light and the other diffraction grating being configured to diffract the light at a diffraction order having an absolute value equal to or greater than 2.

12. The optical device according to claim 9, wherein $n_3 < n_2$ or $n_3 = n_2$.

13. An eyewear apparatus, comprising:
at least one optical device,
wherein the optical device comprises:
a diffraction grating configured to diffract an incident light of a given wavelength on the optical device, the diffraction grating having a grating pitch above the given wavelength and being configured to diffract the incident light at a diffraction order having an absolute value equal to or greater than 2,
wherein the optical device comprises an optical waveguide configured to guide the light diffracted at a diffraction order having an absolute value equal to or greater than 2,
wherein the diffraction grating comprises a substrate of a first dielectric material with refractive index $n_3$ and at least one second dielectric material with refractive index $n_2$ on top of the substrate, wherein the diffraction grating comprises a base pattern comprising the second dielectric material, the base pattern being configured to form a nanojet beam associated with edges of the base pattern from the light, and the base pattern comprises two blocks of the second dielectric material with refractive index $n_2$ having identical widths and heights, on top of the substrate, the two blocks being separated by a distance $W_1$, the two blocks having a height $H_2$ with $$H_2 \geq \frac{W_2}{\tan \theta'_{B1}}$$

and $$H_2 < \frac{W_2}{\tan \theta''_{B1}}$$

with $W_2$ being the width of each of the two blocks and $\theta'_{B1}$ and $\theta''_{B1}$ being respective angles of nanojet beam radiations associated with edges of the base pattern from the light, and wherein $$\theta'_{B1} \approx \theta_{B1} - \frac{\theta_i}{2}, \theta''_{B1} \approx \theta_{B1} + \frac{\theta_i}{2}$$

with $\theta_i$ being the angle of the incident light with respect to a normal to the top surface of the diffraction grating and $$\theta_{B1} \approx \frac{90° - \sin^{-1}\left(\frac{n_1}{n_2}\right)}{2},$$

$n_1$ being the refractive index of a host medium in which the diffraction grating is placed,
wherein $W_1$ being the distance separating the two blocks, and $W_2$ being the width of each of the two blocks, and
wherein $W_1$ and $W_2$ depend on a grating pitch d of the diffraction grating with $$W_1 < \frac{d}{3}$$

and $$W_1 + W_2 \neq \frac{d}{2}.$$

14. The eyewear apparatus according to claim 13, further comprising:
a light display engine configured to emit an image to display, and
optics configured to couple incoming light from the light display engine to the optical waveguide,
the optical waveguide being configured to guide incoming light towards an eye of a user to make the image visible to the user.

* * * * *